(12) United States Patent
Takeuchi et al.

(10) Patent No.: US 10,950,858 B2
(45) Date of Patent: Mar. 16, 2021

(54) IC POWER SOURCE, VARIOUS IC PRODUCTS PROVIDED WITH SAME, METHOD FOR SUPPLYING POWER TO IC, AND METHOD FOR DRIVING IC

(71) Applicant: NGK INSULATORS, LTD., Nagoya (JP)

(72) Inventors: Yukihisa Takeuchi, Nagoya (JP); Iwao Ohwada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 85 days.

(21) Appl. No.: 16/391,667

(22) Filed: Apr. 23, 2019

(65) Prior Publication Data

US 2019/0252718 A1 Aug. 15, 2019

Related U.S. Application Data

(63) Continuation of application No. PCT/JP2017/027863, filed on Aug. 1, 2017.

(30) Foreign Application Priority Data

Nov. 11, 2016 (JP) .............................. JP2016-220914
Jan. 31, 2017 (JP) .............................. JP2017-015943

(51) Int. Cl.
*H01M 10/0562* (2010.01)
*H01M 4/525* (2010.01)
(Continued)

(52) U.S. Cl.
CPC .............. *H01M 4/525* (2013.01); *H01M 2/10* (2013.01); *H01M 4/131* (2013.01); *H01M 4/40* (2013.01);
(Continued)

(58) Field of Classification Search
CPC ........ H01M 4/525; H01M 4/131; H01M 4/40; H01M 4/485; H01M 4/505; H01M 4/02;
(Continued)

(56) References Cited

U.S. PATENT DOCUMENTS 6,805,998 B2 * 10/2004 Jenson ................. C23C 16/047
429/162
9,608,297 B2 * 3/2017 van Lammeren ... H01M 10/445
(Continued)

FOREIGN PATENT DOCUMENTS

JP    H03-071566 A1    3/1991
JP    H04-010366 A1    1/1992
(Continued)

OTHER PUBLICATIONS

International Search Report and Written Opinion (Application No. PCT/JP2017/027863) dated Nov. 7, 2017 (with English translation).

*Primary Examiner* — Raymond Alejandro
(74) *Attorney, Agent, or Firm* — Burr & Brown, PLLC

(57) ABSTRACT

Various useful IC-related applications are provided using all solid lithium secondary batteries. For example, there is provided a power source for integrated circuit (IC) that includes an all-solid-state lithium secondary battery including a positive electrode layer, a solid electrolyte layer, and a negative electrode layer, wherein the all-solid-state lithium secondary battery itself has a function as a bypass capacitor, thereby being capable of supplying a temporarily increased peak current in addition to a steady current.

14 Claims, 9 Drawing Sheets

(51) Int. Cl.

| | |
|---|---|
| *H01M 10/0525* | (2010.01) |
| *H01M 4/485* | (2010.01) |
| *H02J 1/00* | (2006.01) |
| *H01M 10/0585* | (2010.01) |
| *H01M 10/052* | (2010.01) |
| *H01M 4/505* | (2010.01) |
| *H01M 4/40* | (2006.01) |
| *H01M 10/617* | (2014.01) |
| *H02J 7/04* | (2006.01) |
| *H01M 10/667* | (2014.01) |
| *H02J 7/34* | (2006.01) |
| *H01M 10/658* | (2014.01) |
| *H01M 10/44* | (2006.01) |
| *H01M 10/615* | (2014.01) |
| *H01M 10/6571* | (2014.01) |
| *H01M 2/10* | (2006.01) |
| *H01M 4/131* | (2010.01) |
| *H01M 10/058* | (2010.01) |
| *H01M 10/42* | (2006.01) |
| *H02J 7/00* | (2006.01) |
| *H01M 4/02* | (2006.01) |

(52) U.S. Cl.
CPC ........... *H01M 4/485* (2013.01); *H01M 4/505* (2013.01); *H01M 10/052* (2013.01); *H01M 10/058* (2013.01); *H01M 10/0525* (2013.01); *H01M 10/0562* (2013.01); *H01M 10/0585* (2013.01); *H01M 10/425* (2013.01); *H01M 10/44* (2013.01); *H01M 10/615* (2015.04); *H01M 10/617* (2015.04); *H01M 10/658* (2015.04); *H01M 10/6571* (2015.04); *H01M 10/667* (2015.04); *H02J 1/00* (2013.01); *H02J 7/007* (2013.01); *H02J 7/04* (2013.01); *H02J 7/34* (2013.01); *H01M 4/02* (2013.01); *H01M 2004/021* (2013.01); *H01M 2010/4271* (2013.01); *H01M 2220/30* (2013.01); *H01M 2300/0065* (2013.01)

(58) Field of Classification Search
CPC .... H01M 2/10; H01M 2/1022; H01M 2/1027; H01M 10/615; H01M 10/617; H01M 10/6571; H01M 10/658; H01M 10/667; H01M 10/052; H01M 10/0525; H01M 10/0562; H01M 10/058; H01M 10/0585; H01M 10/425; H01M 10/44; H01M 2004/021; H01M 2010/4271; H01M 2220/30; H01M 2300/0065; H01J 1/00; H01J 7/007; H01J 7/04; H01J 7/34

See application file for complete search history.

(56) References Cited

U.S. PATENT DOCUMENTS

| | | |
|---|---|---|
| 2001/0033963 A1 | 10/2001 | Yamazaki et al. |
| 2004/0009756 A1 | 1/2004 | Kuranuki et al. |
| 2008/0138701 A1 | 6/2008 | Kuboki et al. |
| 2016/0071552 A1 | 3/2016 | Ohwada et al. |
| 2016/0181588 A1* | 6/2016 | Tsunokuni ........ H01M 10/0463 429/61 |
| 2016/0268639 A1 | 9/2016 | Mizuno et al. |
| 2017/0373300 A1 | 12/2017 | Maeda et al. |

FOREIGN PATENT DOCUMENTS

| | | |
|---|---|---|
| JP | 2001-308537 A1 | 11/2001 |
| JP | 2002-008604 A1 | 1/2002 |
| JP | 2003-197164 A1 | 7/2003 |
| JP | 2004-096714 A1 | 3/2004 |
| JP | 2005-260699 A1 | 9/2005 |
| JP | 2005-286011 A1 | 10/2005 |
| JP | 2006-196397 A1 | 7/2006 |
| JP | 2008-147391 A1 | 6/2008 |
| JP | 2009-516359 A1 | 4/2009 |
| JP | 2013-105708 A1 | 5/2013 |
| WO | 2007/061928 A2 | 5/2007 |
| WO | 2015/170545 A1 | 11/2015 |
| WO | 2016/152565 A1 | 9/2016 |

* cited by examiner

IC POWER SOURCE, VARIOUS IC PRODUCTS PROVIDED WITH SAME, METHOD FOR SUPPLYING POWER TO IC, AND METHOD FOR DRIVING IC

CROSS-REFERENCE TO RELATED APPLICATIONS

This application is a continuation application of PCT/JP2017/027863 filed Aug. 1, 2017, which claims priority to Japanese Patent Application No. 2016-220914 filed Nov. 11, 2016 and Japanese Patent Application No. 2017-015943 filed Jan. 31, 2017, the entire contents all of which are incorporated herein by reference.

BACKGROUND OF THE INVENTION

1. Field of the Invention

The present invention relates to a power source for an integrated circuit (IC), various IC products (in particular, an IC package, an IC substrate, and an IC device) provided with the power source, a method for supplying power to the IC, and a method for driving the IC.

2. Description of the Related Art

In recent years, batteries used as power sources for such devices have greatly been subject to increasing demand along with the development of portable devices, such as personal computers and mobile phones. Batteries used in such applications contain liquid electrolytes (electrolytic solutions) composed of flammable organic solvents (dilution solvents), which have been conventionally used as media for migration of ions. Batteries containing such electrolytic solutions may cause problems, such as electrolyte leakage, ignition, and explosion. To solve such problems and ensure intrinsic safety, all-solid-state lithium secondary batteries have been developed that include solid electrolytes instead of liquid electrolytes and are entirely composed of solid elements. The all-solid-state lithium secondary batteries, which contain solid electrolytes, have advantages of rare ignition, no leakage of liquid content, and less degradation in battery performance due to corrosion.

For example, Patent Document 1 (JP2013-105708A) discloses an all-solid-state lithium secondary battery including a positive electrode layer made of lithium cobaltate (LiCoO$_2$), a negative electrode layer made of metallic lithium, and a solid electrolyte layer that can be composed of a lithium phosphate oxynitride (LiPON) glass electrolyte, and states that the positive electrode layer is formed by sputtering and has a thickness within a range of 1 to 15 μm. All-solid-state lithium secondary batteries including positive electrode with increased thickness have also been proposed to enhance their capacitances. For example, Patent Document 2 (JP2009-516359A) discloses an all-solid-state lithium secondary battery including a positive electrode having a thickness of more than about 4 μm and less than about 200 μm, a solid electrolyte having a thickness of less than about 10 μm, and a negative electrode having a thickness of less than about 30 μm. These documents, however, do not state that positive electrode active materials are oriented.

Patent Document 3 (WO2016/152565) discloses an all-solid-state lithium secondary battery including a crystallographically oriented positive electrode plate. This oriented positive electrode plate is composed of an oriented polycrystalline aggregation made of lithium transition metal oxide grains oriented in a predetermined direction. Even if a thick positive electrode active material is disposed, efficient intercalation and deintercalation of lithium ions can be readily performed over the entire thickness of the positive electrode layer, resulting in a maximum effect of increasing the capacitance due to a thick positive electrode active material. For example, lithium present on a side, remote from the solid electrolyte, of the thick positive electrode layer can be sufficiently utilized for charge and discharge. Such an increase in capacitance can also greatly increase the energy density of the all-solid-state lithium secondary battery. In other words, such an all-solid-state lithium secondary battery has superior practical characteristics, such as a large capacitance and a high energy density. The all-solid-state lithium secondary battery can accordingly have high safety, high capacitance, and a high energy density regardless of relatively thin or small dimensions. In particular, the oriented positive electrode plate can be composed of a ceramic sintered body and, thus, can be readily shaped into a large thickness, compared to a film formed by a gas phase deposition process, such as sputtering, and can advantageously have a precisely controlled composition by strictly weighing the raw material powders. In other words, the all-solid-state lithium secondary battery including a crystallographically oriented positive electrode plate has an advantage in that the capacitance and energy density of a battery can be increased by increasing the thickness of the positive electrode.

Patent Document 4 (WO2015/170545) discloses a volatile memory backup system including an all-solid-state lithium secondary battery, and in particular, a backup system including a hybrid backup power source that is a combination of an all-solid-state lithium secondary battery and a bypass capacitor. In this document, the all-solid-state battery safely and reliably functions even if exposed to a high temperature of about 95° C. (that is, heat resistant) and can be suitably thinned or miniaturized, and thus can be disposed on or near the substrate where the memory, such as a DRAM, is mounted.

CITATION LIST

Patent Documents

Patent Document 1: JP2013-105708A
Patent Document 2: JP2009-516359A
Patent Document 3: WO2016/152565
Patent Document 4: WO2015/170545

SUMMARY OF THE INVENTION

The present inventors have found a new application in a form more closely related to an integrated circuit (IC) in order to take full advantage of an all-solid-state lithium secondary battery which not only has high heat resistance but also is suitable for thinning or miniaturization. In detail, all-solid-state lithium secondary batteries can be used as bypass capacitors for ICs and/or as micro power sources that can be built in or mounted on various IC products (in particular, IC packages, IC substrates, and IC devices), thereby providing various useful IC-related applications.

Accordingly, it is an object of the present invention to provide various useful IC-related applications of all-solid-state lithium secondary batteries.

The present invention provides the following aspects:

[Aspect 1]

A power source for an Integrated Circuit (IC) comprising an all-solid-state lithium secondary battery including a positive electrode layer, a solid electrolyte layer, and a negative electrode layer, wherein the all-solid-state lithium secondary battery itself has a function as a bypass capacitor, thereby being capable of supplying a temporarily increased peak current in addition to a steady current.

[Aspect 2]

The power source according to Aspect 1, wherein the solid electrolyte layer, an interface between the solid electrolyte layer and the negative electrode layer, and another interface between the solid electrolyte layer and the positive electrode layer have an electrostatic capacity sufficient to allow the all-solid-state lithium secondary battery to function as a bypass capacitor as a whole, and the electrostatic capacity is derived from a parasitic capacitance in an equivalent circuit including the power source.

[Aspect 3]

The power source according to Aspect 1 or 2, wherein the material constituting the solid electrolyte layer has a relative dielectric constant $\varepsilon_r$ of 10 to 2000.

[Aspect 4]

The power source according to any one of Aspects 1 to 3, wherein the solid electrolyte layer has a thickness of 0.1 to 20 μm and longitudinal and transverse dimensions in a range of 1 to 50 mm.

[Aspect 5]

The power source according to any one of Aspects 1 to 4, wherein the all-solid-state lithium secondary battery has a thickness of 10 to 5000 μm and longitudinal and transverse dimensions in a range of 1 to 50 mm.

[Aspect 6]

The power source according to any one of Aspects 1 to 5, wherein the all-solid-state lithium secondary battery has an energy density of 10 to 700 Wh/L.

[Aspect 7]

The power source according to any one of Aspects 1 to 5, wherein the positive electrode layer comprises a lithium composite oxide having a layered rock salt structure, the solid electrolyte layer comprises a lithium ion conductive material, and the negative electrode layer comprises lithium.

[Aspect 8]

An IC package provided with a built-in secondary battery, comprising:
  an IC chip;
  the power source according to any one of Aspects 1 to 7 mounted directly on or above the IC chip; and
  a case accommodating the IC chip and the power source.

[Aspect 9]

The IC package provided with a built-in secondary battery according to Aspect 8, wherein no bypass capacitor is disposed in an area within 1 cm from the outer edge of the IC chip.

[Aspect 10]

The IC package provided with a built-in secondary battery according to Aspect 8, comprising no bypass capacitor.

[Aspect 11]

An IC package provided with a built-in secondary battery, comprising:
  a printed wiring board;
  an IC chip mounted on the printed wiring board;
  the power source according to any one of Aspects 1 to 7, disposed, as an inner layer of the printed wiring board, directly below the IC chip; and
  a case accommodating the printed wiring board, the IC chip, and the power source.

[Aspect 12]

The IC package provided with a built-in secondary battery according to Aspect 11, comprising no bypass capacitor in an area within 1 cm from the outer edge of the IC chip.

[Aspect 13]

The IC package provided with a built-in secondary battery according to Aspect 11, comprising no bypass capacitor.

[Aspect 14]

An IC package provided with a built-in secondary battery, comprising:
  a printed wiring board;
  an IC chip mounted on the printed wiring board;
  the power source according to any one of Aspects 1 to 7 mounted on the same plane as the IC chip of the printed wiring board; and
  a case accommodating the printed wiring board, the IC chip and the power source.

[Aspect 15]

The IC package provided with a built-in secondary battery according to Aspect 14, comprising no bypass capacitor in an area within 1 cm from the outer edge of the IC chip.

[Aspect 16]

The IC package provided with a built-in secondary battery according to Aspect 14, comprising no bypass capacitor.

[Aspect 17]

The IC substrate provided with a built-in secondary battery, comprising
  a printed wiring board; and
  an IC chip mounted on the printed wiring board,
  wherein the power source according to any one of Aspects 1 to 7 is disposed, as an inner layer of the printed wiring board, directly below the IC chip.

[Aspect 18]

The IC substrate provided with a built-in secondary battery according to Aspect 17, comprising no bypass capacitor in an area within 1 cm from the outer edge of the IC chip.

[Aspect 19]

The IC substrate provided with a built-in secondary battery according to Aspect 17, comprising no bypass capacitor.

[Aspect 20]

An IC device provided with a built-in secondary battery comprising:
  the IC package provided with a built-in secondary battery according to any one of Aspects 8 to 16 or the IC substrate provided with a built-in secondary battery according to any one of Aspects 17 to 19; and
  a battery controller that supplies the peak current from the all-solid-state lithium secondary battery to the IC to respond to an instantaneous high load operation of the IC and charges the all-solid-state lithium secondary battery after completion of the high-load operation.

[Aspect 21]

A method for supplying electric power to an IC, comprising the steps of:
  providing the power source according to any one of Aspects 1 to 7;
  supplying power to the IC utilizing the power source as a bypass capacitor; and
  charging the all-solid-state lithium secondary battery after supplying electric power to the IC.

[Aspect 22]

The method according to Aspect 21, wherein the supply of power to the IC is performed so as to supply the peak current from the all-solid-state lithium secondary battery to the IC to respond to instantaneous high load operation of the IC and the all-solid-state lithium secondary battery is charged after completion of the high-load operation.

[Aspect 23]

An IC substrate with a mounted secondary battery comprising:
- a printed wiring board;
- a plurality of IC chips mounted on the printed wiring board; and
- a plurality of all-solid-state lithium secondary batteries mounted in an area directly on or above or directly below the IC chip or within 1 cm from the outer edge of the IC chip and provided with a positive electrode layer, a solid electrolyte layer and a negative electrode layer,
- wherein at least one all-solid-state lithium secondary battery for each of the IC chips is connected as a most downstream power source adapted to a power source voltage level required for the IC chip, whereby electric power is individually distributed and supplied to the plurality of IC chips from the plurality of all-solid-state lithium secondary batteries.

[Aspect 24]

The IC substrate with a mounted secondary battery according to Aspect 23, wherein the at least one all-solid-state lithium secondary battery corresponding to each of the IC chips has a specification individually customized according to the performance or specification of the each corresponding IC chip.

[Aspect 25]

The IC substrate with a mounted secondary battery according to Aspect 23 or 24, wherein the all-solid-state lithium secondary battery itself has a function as a bypass capacitor, thereby being capable of supplying a temporarily increased peak current in addition to a steady current.

[Aspect 26]

The IC substrate with a mounted secondary battery according to Aspect 25, wherein the solid electrolyte layer, an interface between the solid electrolyte layer and the negative electrode layer, and another interface between the solid electrolyte layer and the positive electrode layer has an electrostatic capacity sufficient to allow the all-solid-state lithium secondary battery to function as a bypass capacitor as a whole, and the electrostatic capacity is derived from a parasitic capacitance in an equivalent circuit including the power source.

[Aspect 27]

The IC substrate with a mounted secondary battery according to any one of Aspects 23 to 26, wherein the material constituting the solid electrolyte layer has a relative dielectric constant $\varepsilon_r$ of 10 to 2000.

[Aspect 28]

The IC substrate with a mounted secondary battery according to any one of Aspects 23 to 27, wherein the solid electrolyte layer has a thickness of 0.1 to 20 μm and longitudinal and transverse dimensions in a range of 1 to 50 mm.

[Aspect 29]

The IC substrate with a mounted secondary battery according to any one of Aspects 23 to 28, wherein the all-solid-state lithium secondary battery has a thickness of 10 to 5000 μm and longitudinal and transverse dimensions in a range of 1 to 50 mm.

[Aspect 30]

The IC substrate with a mounted secondary battery according to any one of Aspects 23 to 29, wherein the all-solid-state lithium secondary battery has an energy density of 10 to 700 Wh/L.

[Aspect 31]

The IC substrate with a mounted secondary battery according to any one of Aspects 23 to 30, wherein the positive electrode layer comprises a lithium composite oxide having a layered rock salt structure, the solid electrolyte layer comprises a lithium ion conductive material, and the negative electrode layer comprises lithium.

[Aspect 32]

The IC substrate with a mounted secondary battery according to any one of Aspects 23 to 31, wherein each of the IC chips is accommodated together with the corresponding power source in a case into a form of an IC package provided with a built-in secondary battery.

[Aspect 33]

The IC substrate with a mounted secondary battery according to Aspect 32, wherein the IC package provided with a built-in secondary battery comprises no bypass capacitor in an area within 1 cm from the outer edge of the IC chip.

[Aspect 34]

The IC substrate with a mounted secondary battery according to Aspect 32, wherein the IC package provided with a built-in secondary battery comprises no bypass capacitor.

[Aspect 35]

The IC substrate with a mounted secondary battery according to any one of Aspects 23 to 31, wherein the all-solid-state lithium secondary battery is disposed, as an inner layer of the printed wiring board, directly below the IC chip.

[Aspect 36]

The IC substrate with a mounted secondary battery according to Aspect 35, wherein the IC substrate provided with a built-in secondary battery comprises no bypass capacitor in an area within 1 cm from the outer edge of the IC chip.

[Aspect 37]

The IC substrate with a mounted secondary battery according to Aspect 35, wherein the IC substrate provided with a built-in secondary battery comprises no bypass capacitor.

[Aspect 38]

The IC substrate with a mounted secondary battery according to any one of Aspects 23 to 37, further comprising a battery controller that supplies a peak current from the all-solid-state lithium secondary battery to the IC to respond to instantaneous high load operation of the IC and charges the all-solid-state lithium secondary battery after completion of the high-load operation.

[Aspect 39]

An IC device with a mounted secondary battery, comprising:
- an IC;
- an all-solid-state lithium secondary battery connected to the IC and including a positive electrode layer, a solid electrolyte layer and a negative electrode layer; and
- a battery controller that supplies a current pulse having a width obtained by dividing a predetermined width evenly or unevenly into n parts (n is an integer of 2 or more) from the all-solid-state lithium secondary battery to the IC so as to process only the n-divided part of one task to be processed with a current pulse having the predetermined width in the IC, thereafter charges the all-solid-state lithium secondary battery, and alternately repeats the supply of the current and the charge of the all-solid-state lithium secondary battery to complete the one task to be processed in the IC.

[Aspect 40]

The IC device with a mounted secondary battery according to Aspect 39, wherein the all-solid-state lithium secondary battery has a function as a bypass capacitor, thereby being capable of supplying a temporarily increased peak current in addition to a steady current.

[Aspect 41]

The IC device with a mounted secondary battery according to Aspect 40, wherein the solid electrolyte layer, an interface between the solid electrolyte layer and the negative electrode layer, and another interface between the solid electrolyte layer and the positive electrode layer have an electrostatic capacity sufficient to allow the all-solid-state lithium secondary battery to function as a bypass capacitor as a whole, and the electrostatic capacity is derived from a parasitic capacitance in an equivalent circuit including the power source.

[Aspect 42]

The IC device with a mounted secondary battery according to any one of Aspects 39 to 41, wherein the material constituting the solid electrolyte layer has a relative dielectric constant $\varepsilon_r$ of 10 to 2000.

[Aspect 43]

The IC device with a mounted secondary battery according to any one of Aspects 39 to 42, wherein the solid electrolyte layer has a thickness of 0.1 to 20 µm and longitudinal and transverse dimensions in a range of 1 to 50 mm.

[Aspect 44]

The IC device with a mounted secondary battery according to any one of Aspects 39 to 43, wherein the all-solid-state lithium secondary battery has a thickness of 10 to 5000 µm and longitudinal and transverse dimensions in a range of 1 to 50 mm.

[Aspect 45]

The IC device provided with a built-in secondary battery according to any one of Aspects 39 to 44, wherein the all-solid-state lithium secondary battery has an energy density of 10 to 700 Wh/L.

[Aspect 46]

The IC device with a mounted secondary battery according to any one of Aspects 39 to 45, wherein the positive electrode layer comprises a lithium composite oxide having a layered rock salt structure, the solid electrolyte layer comprises a lithium ion conductive material, and the negative electrode layer comprises lithium.

[Aspect 47]

The IC device with a mounted secondary battery according to any one of Aspects 39 to 46, wherein each of the IC chips is accommodated together with the corresponding power source in a case into a form of an IC package provided with a built-in secondary battery.

[Aspect 48]

The IC device with a mounted secondary battery according to Aspect 47, wherein the IC package provided with a built-in secondary battery comprises no bypass capacitor in an area within 1 cm from the outer edge of the IC chip.

[Aspect 49]

The IC device with a mounted secondary battery according to Aspect 47, wherein the IC package provided with a built-in secondary battery comprises no bypass capacitor.

[Aspect 50]

The IC device with a mounted secondary battery according to any one of Aspects 39 to 46, wherein the all-solid-state lithium secondary battery is disposed, as an inner layer of the printed wiring board, directly below the IC chip.

[Aspect 51]

The secondary battery with a mounted IC device according to Aspect 50, wherein the IC substrate provided with a built-in secondary battery comprises no bypass capacitor in an area within 1 cm from the outer edge of the IC chip.

[Aspect 52]

The secondary battery with a mounted IC device according to Aspect 50, wherein the IC substrate provided with a built-in secondary battery comprises no bypass capacitor.

[Aspect 53]

The secondary battery with a mounted IC device according to any one of Aspects 39 to 52, wherein the battery controller supplies the peak current from the all-solid-state lithium secondary battery to the IC to respond to an instantaneous high load operation of the IC and charges the all-solid-state lithium secondary battery after completion of the high-load operation.

[Aspect 54]

A method of driving an IC using an all-solid-state lithium secondary battery, comprising the steps of:
providing an IC being connected to an all-solid-state lithium secondary battery comprising a positive electrode layer, a solid electrolyte layer and a negative electrode layer;
supplying a current pulse having a width obtained by dividing a predetermined width evenly or unevenly into n parts (n is an integer of 2 or more) from the all-solid-state lithium secondary battery to the IC so as to process only the n-divided part of one task to be processed with a current pulse having the predetermined width in the IC; thereafter
charging the all-solid-state lithium secondary battery; and
alternately repeating the supply of the current and the charge of the all-solid-state lithium secondary battery to complete the one task in the IC.

[Aspect 55]

A method of promoting charge of an all-solid-state lithium secondary battery or a lithium ion secondary battery comprising an ionic liquid as an electrolytic solution used as a power source for an IC, comprising:
performing the charge of the all-solid-state lithium secondary battery or the lithium ion secondary battery selectively in a high-temperature state immediately after an IC operation, thereby promoting the charge of the battery.

[Aspect 56]

A method of promoting charge and discharge of an all-solid-state lithium secondary battery or a lithium ion secondary battery comprising an ionic liquid as an electrolytic solution used as a power source for an IC, comprising:
intentionally heating the secondary battery with a heater or resistance wiring disposed in a circuit including an IC, thereby promoting charging and discharging.

[Aspect 57]

An IC package provided with a built-in secondary battery comprising a printed wiring board, an IC chip and a power source for an IC, wherein the power source for an IC is an all-solid-state lithium secondary battery, and the IC package has a function of raising or holding the operating temperature of the power source for an IC to 40 to 120° C. due to heat generated by the internal resistance of the power source for an IC during an operation of the IC chip.

[Aspect 58]
An IC package provided with a built-in secondary battery comprising a printed wiring board, an IC chip and a power source for an IC, wherein the power source for an IC is an all-solid-state lithium secondary battery, the IC package has a function of raising or holding the operating temperature of the power source for an IC to 40 to 120° C. by transferring heat generated in the IC chip to the power source for an IC during an operation of the IC chip.

[Aspect 59]
The IC package provided with a built-in secondary battery according to Aspect 57 or 58, wherein the operation temperature of the power source for an IC is maintained at 60 to 120° C.

[Aspect 60]
An IC package provided with a built-in secondary battery comprising printed wiring board, an IC chip, and a power source for an IC, wherein the power source for an IC is a lithium ion secondary battery including an ionic liquid as an electrolytic solution, and the IC package has a function of raising or holding the operating temperature of the power source for an IC to 40 to 85° C. due to heat generated by the internal resistance of the power source for an IC during an operation of the IC chip.

[Aspect 61]
An IC package provided with a built-in secondary battery comprising a printed wiring board, an IC chip, and a power source for an IC, wherein the power source for an IC is a lithium ion secondary battery including an ionic liquid as an electrolytic solution, and wherein the IC package has a function of raising or holding the operating temperature of the power source for an IC to 40 to 85° C. by transferring heat generated in the IC chip to the power source for an IC during an operation of the IC chip.

[Aspect 62]
The IC package provided with a built-in secondary battery according to any one of Aspects 57 to 61, wherein the IC chip and the power source for an IC are electrically connected by a thermally electrically conductive member, and heat generated in the IC chip during an operation of the IC chip is transferred to the power source for an IC through the thermally electrically conductive member.

[Aspect 63]
The IC package provided with a built-in secondary battery according to Aspect 62, wherein the thermally electrically conductive member is a ground plane.

[Aspect 64]
The IC package provided with a built-in secondary battery according to any one of Aspects 57 to 63, wherein the IC chip and the power source for an IC are mounted on the same face of the printed wiring board, and the IC chip and the power source for an IC are accommodated in a heat insulating member, whereby heat dissipation from the IC chip and the power source for an IC is reduced.

[Aspect 65]
The IC package provided with a built-in secondary battery according to any one of Aspects 57 to 63, wherein the power source for an IC is disposed, as an inner layer of the printed wiring board, directly under the IC chip and heat radiation from the power source for an IC is reduced by the heat insulating property of the printed wiring board.

[Aspect 66]
A method of operating an IC chip and a power source for an IC, comprising steps of:
providing an IC package having a printed wiring board, an IC chip, and a power source for an IC; and
raising or holding the operating temperature of the power source for an IC to 40 to 120° C. due to heat generated by the internal resistance of the power source for an IC during an operation of the IC chip,
wherein the power source for an IC is an all-solid-state lithium secondary battery.

[Aspect 67]
A method of operating an IC chip and a power source for an IC, comprising steps of:
providing an IC package having a printed wiring board, an IC chip, and a power source for an IC; and
raising or holding the operating temperature of the power source for an IC to 40 to 120° C. by transferring heat generated in the IC chip to the power source for an IC during an operation of the IC chip,
wherein the power source for an IC is an all-solid-state lithium secondary battery.

[Aspect 68]
The method according to Aspect 66 or 67, wherein the operation temperature of the power source for an IC is maintained at 60 to 120° C.

[Aspect 69]
A method of operating an IC chip and a power source for an IC, comprising steps of:
providing an IC package having a printed wiring board, an IC chip, and a power source for an IC; and
raising or holding the operating temperature of the power source for an IC to 40 to 85° C. due to heat generated by the internal resistance of the power source for an IC during an operation of the IC chip, wherein the power source for an IC is a lithium ion secondary battery containing an ionic liquid as an electrolytic solution.

[Aspect 70]
A method of operating an IC chip and a power source for an IC, comprising the steps of:
providing an IC package having a printed wiring board, an IC chip, and a power source for an IC; and
raising or holding the operating temperature of the power source for an IC to 40 to 85° C. by transferring heat generated in the IC chip to the power source for an IC during an operation of the IC chip,
wherein the power source for an IC is a lithium ion secondary battery containing an ionic liquid as an electrolytic solution.

[Aspect 71]
The method according to any one of Aspects 66 to 70, wherein the IC chip and the power source for an IC are electrically connected by a thermally electrically conductive member in the IC package, and the heat generated in the IC chip during an operation of the IC chip is transferred to the power source for an IC through the thermally electrically conductive member.

[Aspect 72]
The method according to Aspect 71, wherein the thermally electrically conductive member is a ground plane.

[Aspect 73]
The method according to any one of Aspects 66 to 72, wherein the IC chip and the power source for an IC are mounted on the same face of the printed wiring board, and the IC chip and the power source for an IC are accommodated in a heat insulating member, whereby heat dissipation from the IC chip and the power source for an IC is reduced.

[Aspect 74]
The method according to any one of Aspects 66 to 72, wherein the power source for an IC is disposed, as an inner layer of the printed wiring board, directly under the IC chip and heat radiation from the power source for an IC is reduced by the heat insulating property of the printed wiring board.

[Aspect 75]

The method according to any one of Aspects 55, 56 and 66 to 74, wherein the power source for an IC is the power source for an IC or the all-solid-state lithium secondary battery according to any one of Aspects 1 to 54, and optionally, the power source for an IC or the all solid-state lithium secondary battery is provided in a form of the IC package provided with a built-in secondary battery, the IC substrate provided with a built-in secondary battery, the IC substrate with a mounted secondary battery and/or the IC device with a mounted secondary battery.

[Aspect 76]

The IC package provided with a built-in secondary battery according to any one of Aspects 57 to 65, wherein the power source for an IC is the power source for an IC or the all solid-state lithium secondary battery according to any one of Aspects 1 to 54.

DESCRIPTION OF EMBODIMENT

A. Various IC Related Applications

As described above, the present invention provides various useful Integrated Circuit (IC) related applications using all-solid-state lithium secondary batteries. Such IC related applications include A1) a bypass capacitor, A2) a POL power source, A3) method of driving an IC, and A4) a rapid charge and discharge. Any of these applications is a new application of an all-solid-state lithium secondary battery in such a configuration that is more closely related to the IC. It should be appreciated that any combination of two or more configurations selected from these applications A1 to A4 can be used and are included in the scope of the present invention. In this specification, the IC includes a wide range of ICs such as CPUs, DSPs, memory, peripheral circuits, and sensors. Each application A1 to A4 will be described below.

A1. Bypass Capacitor Application

According to one aspect of the present invention, the power source for an IC is provided. The power source for an IC, literally, is a power source used for supplying power to an integrated circuit (IC). This power source for an IC includes a typical all-solid-state lithium secondary battery including a positive electrode layer, a solid electrolyte layer, and a negative electrode layer. The all-solid-state lithium secondary battery itself has a function as a bypass capacitor, thereby being capable of supplying a temporarily increased peak current in addition to a steady current.

In other words, as described above, the all-solid-state lithium secondary battery has high heat resistance and is suitable for thinning or miniaturization. This indicates that an all-solid-state lithium secondary battery (i.e., a power source for an IC) can be provided in the form of an all-solid-state chip battery with a size of a chip electronic component, and also indicates that it can be mounted just proximal to the IC, which generates heat (for example, in the inner layer of the printed wiring board or in the IC package). Thus, the supply of the highly responsive current can stabilize the power source for an IC without harmful effects of the inductance component of the wiring. In addition, the thinned or miniaturized all-solid-state lithium secondary battery is provided with a thin solid electrolyte layer (for example, a solid electrolyte thin film). Such a thin solid electrolyte layer has a large electrostatic capacity of the parasitic capacitance component in the equivalent circuit, so that the parasitic capacitance component can have sufficient electrostatic capacity to function as a bypass capacitor.

Figure 1:
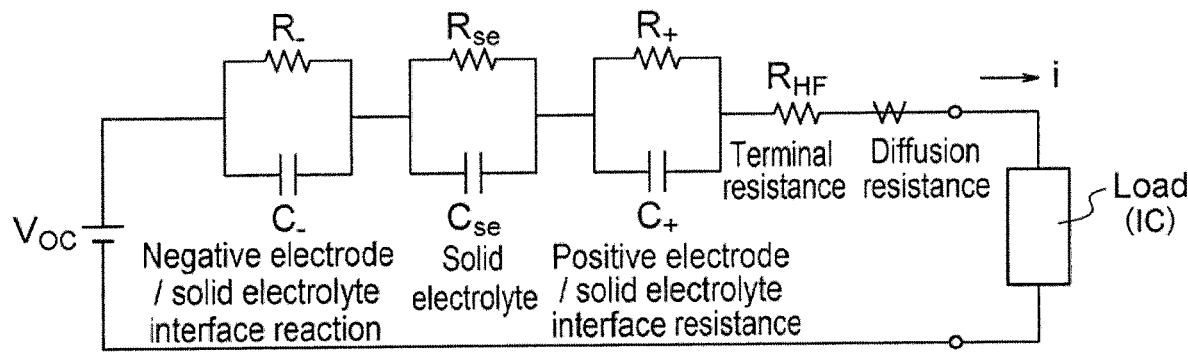
FIG. 1 is a diagram illustrating an exemplary equivalent circuit of an all-solid-state lithium secondary battery connected to a load (IC).
Figure 2:
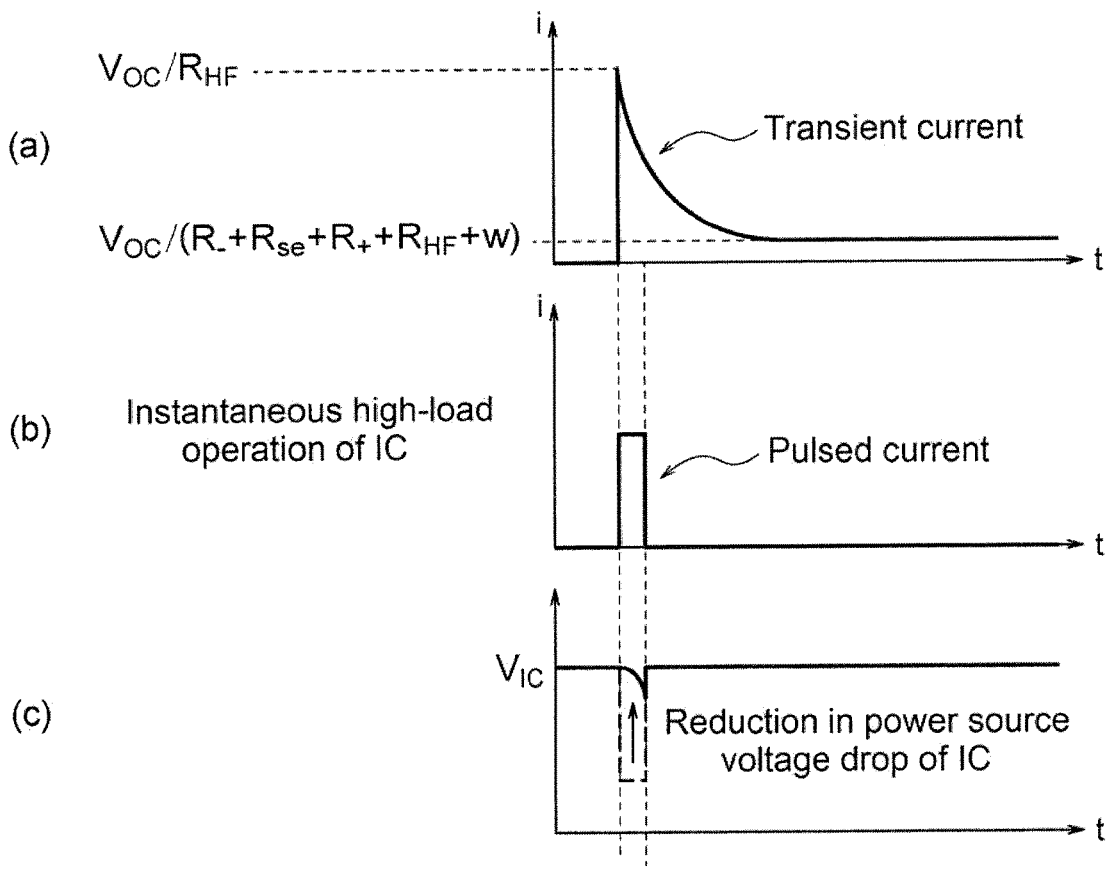
FIG. 2 is a diagram illustrating a relation among transient current, pulse current, and IC operating voltage; specifically, FIGS. 2 (*a*), (*b*), and (*c*), respectively, illustrate a variation in transient current of the all-solid-state lithium secondary battery with time, the pulse current in the instantaneous high load operation of the IC, and a variation in operating voltage with time of the IC.

FIG. 1 illustrates a typical example of the equivalent circuit of an all-solid-state lithium secondary battery connected to a load (IC). In the equivalent circuit illustrated in FIG. 1, symbols $C_-$ and $R_-$ represent electrostatic capacity and resistance, respectively, occurring at the interface between the solid electrolyte layer and the negative electrode layer. Symbols $C_{se}$ and $R_{se}$ represent electrostatic capacity and resistance occurring at the solid electrolyte layer, respectively. Symbols $C_+$ and $R_+$ represent electrostatic capacity and resistance, respectively, occurring at the interface between the solid electrolyte layer and the positive electrode layer. Symbol $V_{OC}$ represents open circuit voltage, symbol $R_{HF}$ represents terminal resistance, and symbol W represents diffusion resistance. In the equivalent circuit shown in FIG. 1, a schematic current waveform in the case that an all-solid-state lithium secondary battery (typically an all-solid-state chip battery) responds to an instantaneous high-load operation of the IC represented by the pulse current shown in FIG. 2 (*b*) is as shown in FIG. 2 (*a*). This behavior suggests that the battery exhibits a bypass capacitor function. In particular, the configuration of the all-solid-state lithium secondary battery closely related to the load (IC) causes the terminal resistance $R_{HF}$ to decrease, resulting in an increase in the initial value $V_{OC}/R_{HF}$ of the transient current illustrated in FIG. 2 (*a*). As the C calculated by $1/C=(1/C_-)+(1/C_{se})+(1/C_+)$ increases, the term of the transient current can be lengthened. In general, an all-solid-state lithium secondary battery operates in a fully charged state and can be recovered to full charge by trickle charge as soon as the pulse current of IC decreases after the operation. Such a bypass capacitor can reduce the power source voltage drop of the IC operating voltage $V_{IC}$ and hence stabilizes the power source for an IC.

According to a preferred aspect of the present invention, the solid electrolyte layer, the interface between the solid electrolyte layer and the negative electrode layer, and the interface between the solid electrolyte layer and the positive electrode layer have an electrostatic capacity sufficient to allow the all-solid-state lithium secondary battery to function as a bypass capacitor, and the electrostatic capacity is derived from a parasitic capacitance in an equivalent circuit including the power source, as a whole. The preferable electrostatic capacity as a bypass capacitor to be disposed just proximal to the IC (for example, less than 1 cm) is 0.001 μF to 0.1 μF, more preferably 0.005 μF to 0.05 μF.

The configuration of the all-solid-state lithium secondary battery constituting the power source for an IC will be described in detail in the section: "B. All-solid-state lithium secondary battery". The following are advantages other than the function as a bypass capacitor.

The high heat resistance of the solid electrolyte layer allows the battery to operate at a high temperature (for example, about 120° C.), which enables disposition of the battery just proximal to the IC, which is also a heating element.

The battery with high energy density can function as a backup power source for, SRAM, DRAM, RTC, for example.

Since the leakage is low (i.e., the leakage current barely occurs), the battery capacity can be maintained for a long time even in an unstable power source state such as energy harvesting.

Various preferred aspects that make the most of the advantages (including a function as a bypass capacitor and other optional advantages described above) of the power source for an IC (that is, the all-solid-state lithium secondary battery) will be described below. It is to be noted that various aspects (i.e., An IC package, an IC substrate, and an IC device) described below are particularly suitable for applications of IoT module microcomputers (especially those having a volatile memory such as SRAM) and IoT module wireless communication devices (for example, Bluetooth Low Energy (BLE) devices).

Figure 3:
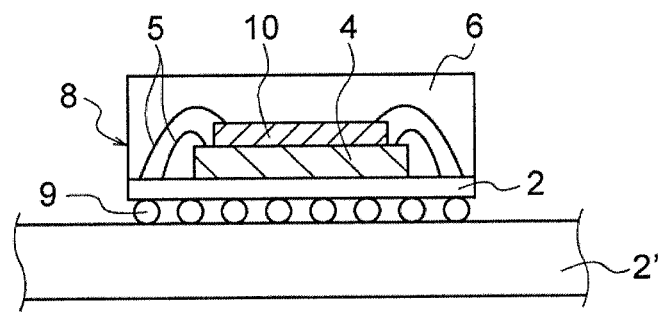
FIG. 3 is a schematic cross-sectional view of an all-solid-state lithium secondary battery mounted directly on or above an IC chip.

A preferred aspect of the present invention, as schematically shown in FIG. 3, provides an IC package 8 provided with a built-in secondary battery including an IC chip 4, a power source for an IC 10, i.e. the all-solid-state lithium secondary battery 10, of the present invention mounted directly on or above the IC chip 4, and the case 6 accommodating the IC chip 4 and the power source 10. In this manner, the power source 10 mounted just proximal to the IC chip 4 with heat generation supplies a highly responsive current without harmful effects of the inductance component of the wiring, leading to stabilization of the power source for an IC 10. In addition, the power source for an IC 10 functions as a bypass capacitor to reduce the power source voltage drop of the IC operation voltage $V_{IC}$ as shown in FIG. 2 (*c*), leading to further stabilization of the power source for an IC 10. The IC package provided with a built-in secondary battery 8, therefore, preferably includes no bypass capacitor in an area within 1 cm from the outer edge of the IC chip 4. More preferably, the IC package provided with a built-in secondary battery 8 includes no bypass capacitor. It is preferred that the IC package 8 include a printed wiring board 2, on which the IC chip 4 and the power source for an IC 10 are mounted in sequence. In this case, the IC chip 4 and the power source for an IC 10 are preferably connected to the printed wiring board 2 with bonding wires 5, respectively, and the IC package 8 (in particular, the printed wiring board 2) can be mounted on a larger printed wiring board 2' through bumps 9. In other words, the printed wiring boards 2 and 2' are electrically connected by bumps 9. An exemplary package is a ball grid array (BGA).

Figure 4:
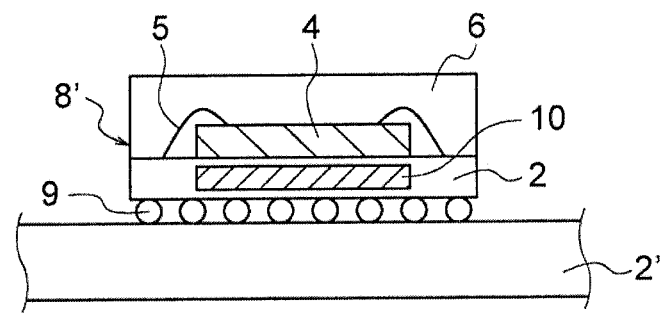
FIG. 4 is a diagram schematically showing an IC package in which an all-solid-state lithium secondary battery is mounted as an inner layer of a printed wiring board directly under an IC chip.

Another preferred aspect of the present invention, as schematically illustrated in FIG. 4, provides an IC package provided with a built-in secondary battery 8', comprising a printed wiring board 2, an IC chip 4 mounted on the printed wiring board 2, a power source for an IC 10 (i.e., the all-solid-state lithium secondary battery 10) of the present invention disposed as the inner layer of the printed wiring board 2 directly under the IC chip 4, and a case 6 accommodating the printed wiring board 2, the IC chip 4 and the power source 10. In this manner, the power source 10 mounted just proximal to the IC chip 4 with heat generation supplies a highly responsive current without harmful effects of the inductance component of the wiring, leading to stabilization of the power source for an IC 10. In addition, the power source for an IC 10 functions as a bypass capacitor to reduce the power source voltage drop of the IC operation voltage $V_{IC}$ as shown in FIG. 2 (*c*), leading to further stabilization of the power source for an IC 10. The IC package provided with a built-in secondary battery 8', therefore, preferably includes no bypass capacitor in an area within 1 cm from the outer edge of the IC chip 4. More preferably, the IC package provided with a built-in secondary battery 8' includes no bypass capacitor. The IC chip 4 is preferably connected to the printed wiring board 2 by bonding wires 5, and the IC package 8' (in particular, the printed wiring board 2) can be mounted on a larger printed wiring board 2' through bumps 9. In other words, the printed wiring boards 2 and 2' are electrically connected by bumps 9. An exemplary package is a ball grid array (BGA).

Figure 5:
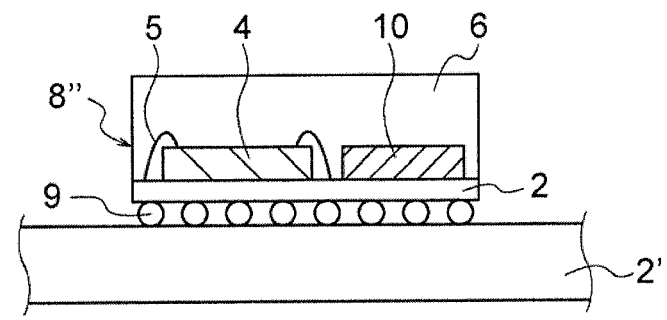
FIG. 5 is a schematic cross-sectional view of an all-solid-state lithium secondary battery and an IC chip of the printed wiring board are mounted on the same plane.

Another preferred aspect of the present invention, as schematically illustrated in FIG. 5, provides an IC package provided with a built-in secondary battery 8", comprising a printed wiring board 2, an IC chip 4 mounted on the printed wiring board 2, a power source for an IC 10 (i.e., the all-solid-state lithium secondary battery 10) of the present invention mounted on the same plane as the IC chip 4 of the printed wiring board 2, and a case 6 accommodating the printed wiring board 2, the IC chip 4 and the power source 10. In this manner, the power source 10 mounted just proximal to the IC chip 4 with heat generation supplies a highly responsive current without harmful effects of the inductance component of the wiring, leading to stabilization of the power source for an IC 10. In addition, the power source for an IC 10 functions as a bypass capacitor to reduce the power source voltage drop of the IC operation voltage $V_{IC}$ as shown in FIG. 2 (*c*), leading to further stabilization of the power source for an IC 10. The IC package provided with a built-in secondary battery 8", therefore, preferably includes no bypass capacitor in an area within 1 cm from the outer edge of the IC chip 4. More preferably, the IC package provided with a built-in secondary battery 8" includes no bypass capacitor. It is preferred that the IC package 8" include a printed wiring board 2, on which the IC chip 4 and the power source for an IC 10 are sequentially mounted. In this case, the IC chip 4 is preferably connected to the printed wiring board 2 with the bonding wires 5, while the power source for an IC 10 is preferably connected to the printed wiring board 2 by means of flip-chip mounting without wire bonding, and the IC package 8 (in particular, the printed wiring board 2) can be mounted on a larger printed wiring board 2' through bumps 9. In other words, the printed wiring boards 2 and 2' are electrically connected by bumps 9. An exemplary package is a ball grid array (BGA).

Figure 6:
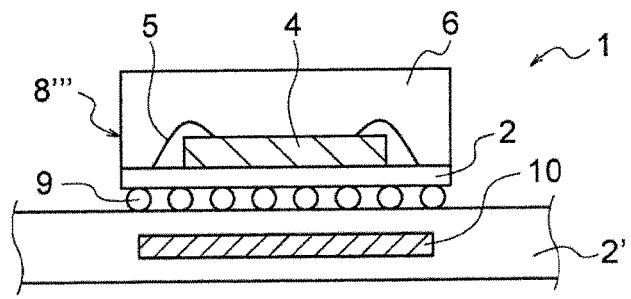
FIG. 6 is a schematic diagram of an IC substrate in which an all-solid-state lithium secondary battery is mounted as an inner layer of a printed wiring board directly under an IC chip.

Another preferred aspect of the present invention, as schematically shown in FIG. 6, provides the IC substrate provided with a built-in secondary battery 1 comprising a printed wiring board 2 and an IC chip 4 mounted on the printed wiring board 2' wherein the power source for an IC 10 (that is, the all-solid-state lithium secondary battery 10) of the present invention is disposed as an inner layer of the printed wiring board 2' directly under the IC chip 4. In this manner, the power source 10 mounted just proximal to the IC chip 4 with heat generation supplies a highly responsive current without harmful effects of the inductance component of the wiring, leading to stabilization of the power source for an IC 10. In addition, the power source for an IC 10 functions as a bypass capacitor to reduce the power source voltage drop of the IC operation voltage $V_{IC}$ as shown in FIG. 2 (*c*), leading to further stabilization of the power source for an IC 10. The IC substrate provided with a built-in secondary battery 1, therefore, preferably includes no bypass capacitor in an area within 1 cm from the outer edge of the IC chip 4. More preferably, the IC substrate with built-in secondary battery 1 includes no bypass capacitor. Preferably, the IC chip 4 is provided in the form of an IC package 8''', which includes a printed wiring board 2, an IC chip 4 mounted on the printed wiring board 2, and a case 6 for accommodating the printed wiring board 2 and the IC chip 4. In this case, the IC chip 4 is preferably connected to the printed wiring board 2 by bonding wires 5, and the IC package 8''' (in particular, the printed wiring board 2) can be mounted on a larger printed wiring board 2' through bumps 9. In other words, the printed wiring boards 2 and 2' are electrically connected by bumps 9. An exemplary package is a ball grid array (BGA).

Another preferred aspect of the present invention provides an IC device provided with a built-in secondary battery including an IC package provided with a built-in secondary battery 8, 8', 8" or an IC substrate with built-in secondary battery 1 and battery controller (not shown). An exemplary battery controller is a battery management unit (BMU). A typical BMU controls the charge and discharge of a secondary battery (charge from an external power source and discharge to a load) to prevent overcharge and overdischarge. The following applications and advantages of the BMU are conceivable.

Figure 7:
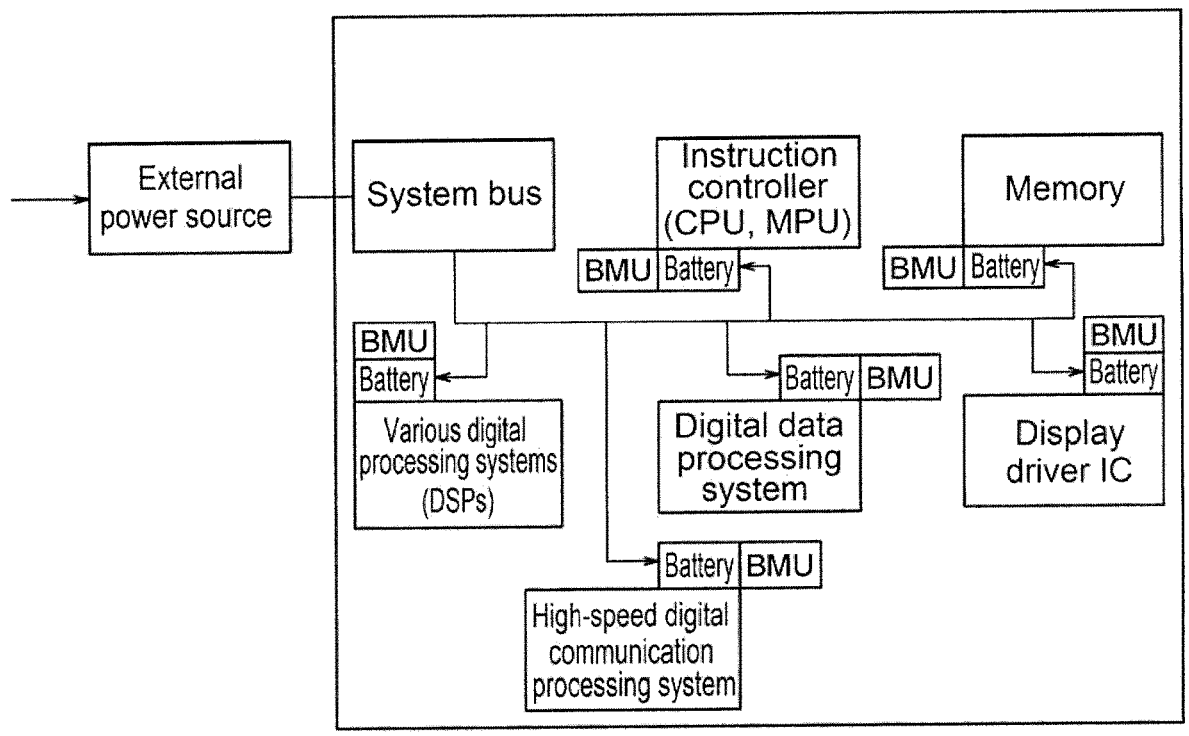
FIG. 7 is a conceptual diagram in which all-solid-state lithium secondary batteries and battery management units (BMU) are used as power sources for on-board microcomputers by a point of load (POL) scheme.

1) Application involving steady power supply to the load: The user can control the battery with a commercially available lithium battery control IC. An example of this application is an external power source shown in FIG. 7.

2) Application performing transient power supply control: For example, substitutional application for a chip capacitor power source. In this case, compatibility can be achieved between the system operation sequence involving a sudden change in current in response to the clock and the battery characteristics. A preferred example of this application is an on-board microcomputer power source shown in FIG. 7.

In this respect, the power source for an IC of the present invention is preferably used for the above application 2) because it has a function as a bypass capacitor and can be mounted just proximal to the IC.

A preferred battery controller (typically, BMU) accordingly supplies the peak current from the all-solid-state lithium secondary battery to the IC to respond to an instantaneous high load operation of the IC and charges the all-solid-state lithium secondary battery after the high-load operation. In this manner, the power source for an IC also functions as a bypass capacitor to reduce the power source voltage drop of the IC operating voltage $V_{IC}$ as shown in FIG. 2 (*c*), leading to further stabilization of the power source for an IC.

Figure 8:
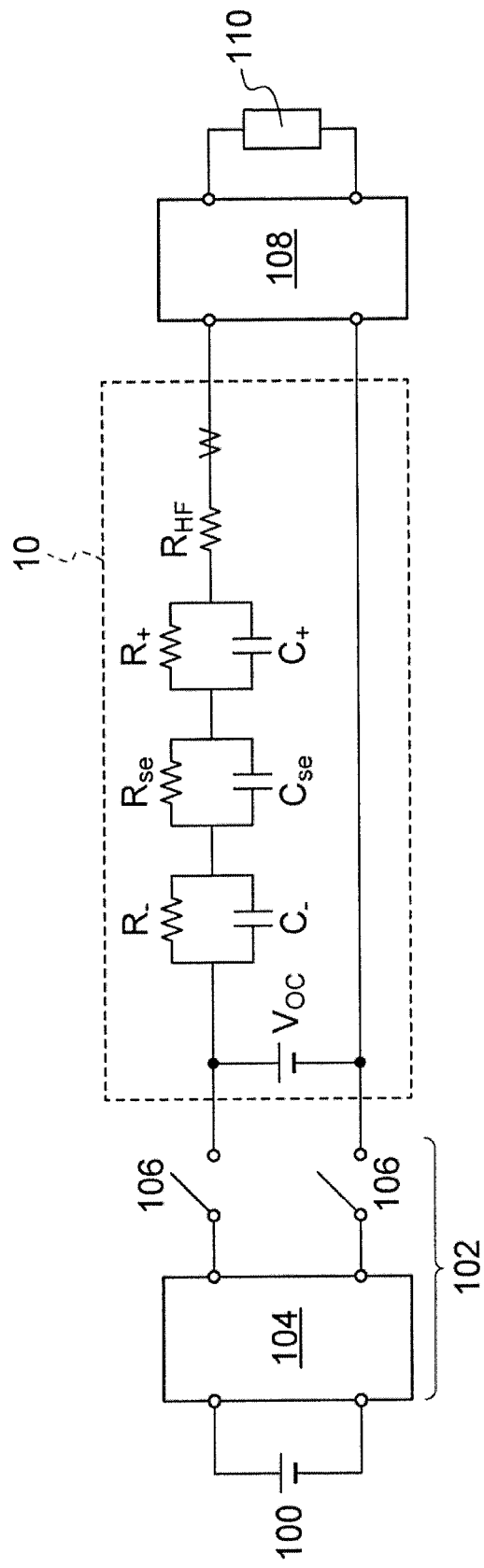
FIG. 8 is a conceptual diagram schematically illustrating the overall configuration of a system including a battery controller.

FIG. 8 schematically illustrates the overall configuration of the system including the battery controller. The system illustrated in FIG. 8 includes an external power source 100, a battery controller 102, an all-solid-state lithium secondary battery 10, an optional DC/DC converter 108, and an IC 110. The battery controller 102 is provided between the external power source 100 and the all-solid-state lithium secondary battery 10 and includes a charger-cum-protect IC 104 and a switch 106. The secondary battery 10 is connected to the battery controller 102 via the switch 106 and supplies power to the IC 110 either through or not through the DC/DC converter 108. Under the control of the charger-cum-protect IC 104, the switch 106 can be turned on at desired timing, for example, only when a desired voltage is detected from the external power source 100, thereby supplying a charge current to the secondary battery 10. In particular, the battery controller 102 preferably control the timing of charge/discharge (charge and discharge sequence) so as to charge the secondary battery 10 during the sleep mode of the IC other than the high load current of the IC 110. Such control achieves the high-load operation of the IC 110 and charge of the secondary battery 10 with high efficiency without interference therebetween. The external power source 100 may be a normal power source for external charging, a solar (photovoltaic: PV) cell or energy harvesting (EH). It should be noted that a circuit protection IC for detecting a drop in the input voltage of the DC/DC converter 108 may be disposed upstream of the DC/DC converter 108. The IC 110 preferably requires the operation of a pulsed current at a low voltage. Examples of such an IC include ICs for IoT modules and environmental sensors.

Another preferred aspect of the present invention provides a method of supplying power to an IC, comprising the steps of: (a) providing a power source for an IC; (b) supplying electric power to the IC by utilizing the power source as a bypass capacitor, and (c) charging the all-solid-state lithium secondary battery after supplying electric power to the IC. It is preferred that the supply of power to the IC be performed such that the all-solid-state lithium secondary battery supplies the peak current to the IC to respond to an instantaneous high-load operation of the IC and is charged after the high-load operation. In this manner, the power source for an IC also functions as a bypass capacitor to reduce the power source voltage drop of the IC operating voltage $V_{IC}$ as shown in FIG. 2 (c), leading to further stabilization of the power source for an IC. The method according to this aspect can be carried out according to various aspects described above (in particular, aspects including the battery controller).

A2. POL Power Source Application

One aspect of the present invention provides an IC substrate with a mounted secondary battery including a printed wiring board, a plurality of IC chips, and a plurality of all-solid-state lithium secondary batteries. As schematically and partially illustrated in FIGS. 3 to 6, while the IC chip 4 is mounted on the printed wiring board 2, the all-solid-state lithium secondary battery 10 is mounted in an area directly on or above or below the IC chip 4 or within 1 cm from the outer edge of the IC chip 4. An all-solid-state lithium secondary battery comprises a positive electrode layer, a solid electrolyte layer, and a negative electrode layer. At least one all-solid-state lithium secondary battery for each of the IC chips is connected as a most downstream power source adapted to a power source voltage level required for the IC chip, whereby electric power is individually distributed and supplied to the plurality of IC chips from the plurality of all-solid-state lithium secondary batteries.

In other words, as described above, the all-solid-state lithium secondary battery has high heat resistance and is suitable for thinning or miniaturization. This indicates that an all-solid-state lithium secondary battery (i.e., a power source for an IC) can be provided in the form of an all-solid-state chip battery with a size of a chip electronic component, and also indicates that it can be mounted just proximal to the IC, which generates heat (for example, in an area directly on or above or directly below the IC chip or within 1 cm from the outer edge of the IC chip). Thus, the supply of the highly responsive current can stabilize the power source for an IC without harmful effects of the inductance component of the wiring. In addition, in the IC substrate with a mounted secondary battery of this aspect, electric power is individually distributed and supplied to the plurality of IC chips from the plurality of all-solid-state lithium secondary batteries. This configuration corresponds to an aspect using an all-solid-state lithium secondary battery as a so-called a point of load (POL) power source. Meanwhile, there has been an increasing demand for diversification of power sources for different required voltages in different ICs such as CPU, DSP, memory, peripheral circuit, and sensor, as well as lower voltage and higher accuracy. In order to respond to such a demand, a POL circuit design in which a power source is disposed just proximal to each IC has recently been proposed, and the IC substrate with a mounted secondary battery of this aspect conforms to this POL concept. An example of this POL power source corresponds to the on-board microcomputer power source illustrated in FIG. 7 mentioned above. The IC substrate with a mounted secondary battery according to this aspect related to the POL or onboard microcomputer power source has the following advantages:

i) The voltage drop and voltage fluctuation accompanied by an increase in IC current can be reduced between the power source and the IC;

ii) Power source noise sensitive to a high sensitivity RF circuit and a sensor input circuit can be reduced; and iii) The reliability of the IC operation can be improved by stable and highly accurate power source voltage Examples of applications of the IC substrate with a mounted secondary battery of this aspect according to the POL or the onboard microcomputer power source include in-vehicle ECUs, robot controlling circuits, various sensor signal processing circuits, image processing circuits for e.g., thin television sets, and communication controlling circuits for e.g., mobile phone base stations. A particularly suitable application of the IC substrate with a mounted secondary battery of this aspect is a POL power source on a large scale circuit board.

In the IC substrate with a mounted secondary battery of this aspect, at least one all-solid-state lithium secondary battery corresponding to each of the IC chips has a specification individually customized according to the performance or specification of the corresponding IC chip. This makes it possible to conveniently cope with diversification of power sources for different required voltages in different ICs such as CPU, DSP, memory, peripheral circuit, and sensor. For example, as illustrated in the following Table 1, the open-circuit voltage $V_{OC}$ of the all-solid-state lithium secondary battery can be set to a desired value by a combination of the positive electrode material and the negative electrode material, so that an all-solid-state lithium secondary battery that provides an optimal open-circuit voltage $V_{OC}$ for each IC may be disposed.

TABLE 1

| Positive electrode | Negative electrode | Charge potential (V) | Average potential (V) |
|---|---|---|---|
| $LiCoO_2$ | Graphite | 4.2 | 3.8 |
| $LiCoO_2$ | Li metal | 4.3 | 3.9 |
| $LiCoO_2$ | Li—Al alloy | 4.1 | 3.8 |
| $LiCoO_2$ | $Li_4Ti_5O_{12}$ | 3.2 | 2.5 |
| $LiCoO_2$ | Sn alloy | 3.6 | 3.2 |
| $LiNiO_2$ | Graphite | 4.2 | 3.7 |
| $LiNi_{0.5}Mn_{1.5}O_4$ | Graphite | 5 | 4.6 |
| $LiNi_{0.5}Mn_{1.5}O_4$ | Li metal | 5.1 | 4.7 |
| $LiFePO_4$ | Graphite | 3.4 | 3 |
| $LiFePO_4$ | $Li_4Ti_5O_{12}$ | 2.2 | 1.7 |

Any all-solid-state lithium secondary battery may be used, and details thereof will be described later in the section "B. All-solid-state lithium secondary battery". Preferably, the all-solid-state lithium secondary battery functions as a bypass capacitor and thus can supply a temporarily increased peak current in addition to a steady current. As described above, the all-solid-state lithium secondary battery has high heat resistance and is suitable for thinning or miniaturization. The thinned or miniaturized all-solid-state lithium secondary battery is provided with a thin solid electrolyte layer (for example, a solid electrolyte thin film). Such a thin solid electrolyte layer has a large electrostatic capacity of the parasitic capacitance component in the equivalent circuit, so that the parasitic capacitance component can have sufficient electrostatic capacity to function as a bypass capacitor.

FIG. 1 illustrates a typical example of the equivalent circuit of an all-solid-state lithium secondary battery connected to a load (IC). In the equivalent circuit illustrated in FIG. 1, symbols $C_-$ and $R_-$ represent electrostatic capacity and resistance, respectively, occurring at the interface between the solid electrolyte layer and the negative electrode layer. Symbols $C_{se}$ and $R_{se}$ represent electrostatic capacity and resistance occurring at the solid electrolyte layer, respectively. Symbols $C_+$ and $R_+$ represent electrostatic capacity and resistance, respectively, occurring at the interface between the solid electrolyte layer and the positive electrode layer. Symbol $V_{OC}$ represents open circuit voltage, symbol $R_{HF}$ represents terminal resistance, and symbol W represents diffusion resistance. In the equivalent circuit shown in FIG. 1, a schematic current waveform in which an all-solid-state lithium secondary battery (typically an all-solid-state chip battery) responds to an instantaneous high-load operation of the IC represented by the pulse current shown in FIG. 2 (b) is as shown in FIG. 2 (a). This behavior suggests that the battery exhibits a bypass capacitor function. In particular, the configuration of the all-solid-state lithium secondary battery closely related to the load (IC) causes the terminal resistance $R_{HF}$ to decrease, resulting in an increase in the initial value $V_{OC}/R_{HF}$ of the transient current illustrated in FIG. 2(a). As the C calculated by $1/C=(1/C_-)+(1/C_{se})+(1/C_+)$ increases, the term of the transient current can be lengthened. In general, an all-solid-state lithium secondary battery operates in a fully charged state and can be recovered to full charge by trickle charge as soon as the pulse current of IC decreases after the operation. Such a bypass capacitor can reduce the power source voltage drop of the IC operating voltage $V_{IC}$, thereby stabilizing the power source for an IC.

According to a preferred aspect of the present invention, the solid electrolyte layer, the interface between the solid electrolyte layer and the negative electrode layer, and the interface between the solid electrolyte layer and the positive electrode layer as a whole have an electrostatic capacity sufficient to allow the all-solid-state lithium secondary battery to function as a bypass capacitor, and the electrostatic capacity is derived from a parasitic capacitance in an equivalent circuit including the power source. The preferable electrostatic capacity as a bypass capacitor to be disposed just proximal to the IC (for example, less than 1 cm) is 0.001 µF to 0.1 µF, more preferably 0.005 µF to 0.05 µF.

The configuration of the all-solid-state lithium secondary battery constituting the power source for an IC will be described in detail in the section: "B. All-solid-state lithium secondary battery". Advantages in addition to the function as a bypass capacitor are as follows:

High heat resistance of the solid electrolyte layer allows the battery to operate at a high temperature (for example, about 120° C.), which enables the battery to be disposed just proximal to the IC, which also functions as a heating element.

The battery with high energy density can function as a backup power source for, SRAM, DRAM, RTC, for example.

Since the leakage is low (i.e., the leakage current barely occurs), the battery capacity can be maintained for a long time even in an unstable power source state such as energy harvesting.

Various preferred aspects that make the most of the advantages (including a function as a bypass capacitor and other optional advantages described above) of the power source for an IC (that is, the all-solid-state lithium secondary battery) will now be described.

According to a preferred aspect of the present invention, as schematically illustrated in FIG. 3, each of the IC chips 4 is accommodated together with the corresponding power source 10 in a case 6 into a form of an IC package provided with a built-in secondary battery 8. That is, the all-solid-state lithium secondary battery 10 is mounted proximal to the IC chip 4 as described above, so that the secondary battery 10 can be built in the IC package 8. Furthermore, since the power source for an IC 10 itself can also function as a bypass capacitor, the IC package provided with a built-in secondary battery 8 preferably includes no bypass capacitor in an area within 1 cm from the outer edge of the IC chip 4. More preferably, the IC package provided with a built-in secondary battery includes no bypass capacitor. It is preferred that the IC package 8 include a printed wiring board 2, on which the IC chip 4 and the power source for an IC 10 are mounted in sequence. In this case, the IC chip 4 and the power source for an IC 10 are preferably connected to the printed wiring board 2 with bonding wires 5, respectively, and the IC package 8 (in particular, the printed wiring board 2) can be mounted on a larger printed wiring board 2' through bumps 9. In other words, the printed wiring boards 2 and 2' are electrically connected by bumps 9. An exemplary package is a ball grid array (BGA).

Another preferred aspect of the present invention, as schematically shown in FIGS. 4 and 6, provides an all-solid-state lithium secondary battery 10 disposed as an inner layer of the printed wiring board 2 or 2' directly below the IC chip 4. Furthermore, the power source for an IC 10 itself can also function as a bypass capacitor; hence, the IC substrate provided with a built-in secondary battery 1 preferably includes no bypass capacitor in an area within 1 cm from the outer edge of the IC chip 4. More preferably, the IC substrate provided with a built-in secondary battery 1 includes no bypass capacitor. As shown in FIGS. 4 and 6, the IC chip 4 is preferably connected to the printed wiring board 2 by a bonding wire 5, and the IC package 8' or 8''' including the printed wiring board 2 can be mounted on a larger printed wiring board 2' through bumps 9. In other words, the printed wiring boards 2 and 2' are electrically connected by bumps 9. An exemplary package is a ball grid array (BGA).

According to another preferred aspect of the present invention, an IC substrate with a mounted secondary battery further comprises a battery controller. An exemplary battery controller is a battery management unit (BMU). A typical BMU controls the charge and discharge of a secondary battery (charge from an external power source and discharge to a load) to prevent overcharge and overdischarge. The following applications and advantages of the BMU are conceivable:

1) Application involving steady power supply to the load: The user can control the battery with a commercially available lithium battery control IC. An example of this application is an external power source shown in FIG. 7.

2) Application performing transient power supply control: For example, substitutional application for a chip capacitor power source. In this case, compatibility can be achieved between the system operation sequence involving a sudden change in current in response to the clock and the battery characteristics. A preferred example of this application is an on-board microcomputer power source shown in FIG. 7.

In this respect, the power source for an IC of the present invention is preferably used in the above application 2) because it can be mounted just proximal to the IC.

A preferred battery controller (typically, BMU) accordingly supplies the peak current from the all-solid-state lithium secondary battery to the IC to respond to an instantaneous high load operation of the IC and charges the all-solid-state lithium secondary battery after the high-load operation. In this manner, the power source for an IC also functions as a bypass capacitor to reduce the drop of the IC operating voltage $V_{IC}$ as shown in FIG. 2 (c), leading to further stabilization of the power source for an IC.

FIG. 8 schematically illustrates the overall configuration of the system including the battery controller. The system illustrated in FIG. 8 includes an external power source 100, a battery controller 102, an all-solid-state lithium secondary battery 10, an optional DC/DC converter 108, and an IC 110. The battery controller 102 is disposed between the external power source 100 and the all-solid-state lithium secondary battery 10 and includes a charger-cum-protect IC 104 and a switch 106. The secondary battery 10 is connected to the battery controller 102 via the switch 106 and supplies power to the IC 110 either through or not through the DC/DC converter 108. Under the control of the charger-cum-protect IC 104, the switch 106 can be turned on at desired timing, for example, only when a desired voltage is detected from the external power source 100, thereby supplying a charge current to the secondary battery 10. In particular, the battery controller 102 preferably controls the timing of charge/discharge (charge and discharge sequence) so as to charge the secondary battery 10 during the sleep mode of the IC other than the high load current of the IC 110. Such control achieves the high-load operation of the IC 110 and the charge of the secondary battery 10 with high efficiency without interference therebetween. The external power source 100 may be a normal power source for external charging, a solar (photovoltaic: PV) cell stack or energy harvesting (EH). It should be noted that a circuit protection IC for detecting a drop in the input voltage of the DC/DC converter 108 may be disposed upstream of the DC/DC converter 108. The IC 110 preferably requires the operation of a pulsed current at a low voltage. Examples of such an IC include ICs for IoT modules and environmental sensors.

A3. Drive of IC

One aspect of the present invention provides a secondary battery with a mounted IC device including an IC, an all-solid-state lithium secondary battery, and a battery controller. The all-solid-state lithium secondary battery is connected to the IC, and comprises a positive electrode layer, a solid electrolyte layer, and a negative electrode layer. The battery controller supplies a current pulse having a width obtained by dividing a predetermined width evenly or unevenly into n parts (n is an integer of 2 or more) from the all-solid-state lithium secondary battery to the IC so as to process only the n-divided part of one task to be processed with a current pulse having the predetermined width in the IC, thereafter charges the all-solid-state lithium secondary battery, and alternately repeats the supply of the current and the charge of the all-solid-state lithium secondary battery to complete the one task to be processed in the IC. Alternatively, another aspect of the present invention provides a method of driving an IC using an all-solid-state lithium secondary battery, comprising the steps of:

(a) providing an IC being connected to an all-solid-state lithium secondary battery comprising a positive electrode layer, a solid electrolyte layer and a negative electrode layer, (b) supplying a current pulse having a width obtained by dividing a predetermined width evenly or unevenly into n parts (n is an integer of 2 or more) from the all-solid-state lithium secondary battery to the IC so as to process only the n-divided part of one task to be processed with a current pulse having the predetermined width in the IC, thereafter (c) charging the all-solid-state lithium secondary battery, and (d) alternately repeating the supply of the current and the charge of the all-solid-state lithium secondary battery to complete the one task to be processed in the IC.

In other words, as described above, the all-solid-state lithium secondary battery has high heat resistance and is suitable for thinning or miniaturization. This indicates that an all-solid-state lithium secondary battery (i.e., a power source for an IC) can be provided in the form of an all-solid-state chip battery with a size of a chip electronic component, and also indicates that it can be mounted just proximal to the IC, which generates heat (for example, in the inner layer of the printed wiring board or in the IC package). Thus, the supply of the highly responsive current can stabilize the power source for an IC without harmful effects of the inductance component of the wiring. A large pulse width, however, requires a peak current flow for a long time in one task to be processed with a current pulse having a predetermined width in the IC. Meanwhile, FIGS. 2(*a*) to 2(*c*) indicate that the peak current, which is a transient current, decays with time and the power source voltage significantly drops in the IC to a level precluding the stable operation of the IC in the case of a large pulse width. To cope with this problem, a potential countermeasure is to manufacture and use an all-solid-state lithium secondary battery of higher performance that can decrease the terminal resistance of $R_{HF}$ and thus raise the initial value $V_{oc}/R_{HF}$ of the transient current. The IC device with a mounted secondary battery of this aspect, however, can solve the problem even without such measures. In other words, this aspect is characterized in that one task, which is to be processed with a current having a predetermined pulse width in the IC, is divided into n parts (n is 2 or more). More specifically, the pulse width can be shortened by supplying a current pulse having a width, which is obtained by dividing the predetermined width evenly or unevenly into n parts, from the all-solid-state lithium secondary battery to the IC, so as to process only the n-divided part of the above one task. Consequently, the drop of the power source voltage in the IC which can be caused by the long pulse width can be remarkably reduced, and the IC can stably perform the divisional task. After the divisional task is executed in this way, the all-solid-state lithium secondary battery is charged such that the secondary battery can supply the peak current again at the initial value $V_{oc}/R_{HF}$. Accordingly, the supply of the current and the charge of the all-solid-state lithium secondary battery are alternately repeated to complete one task to be processed in the IC. That is, the lithium secondary battery is charged every time, and a desired high peak current can be stably supplied to the IC during the divisional task. According to IC device with mounted secondary battery of this aspect, the IC can be always operated stably while the drop of the power source voltage of the IC is remarkably reduced.

The division number n of one task is 2 or more, preferably 2 to 1000, more preferably 10 to 100. Increasing the number of divisions n in this way enables the IC to always operate stably even in large tasks without trouble.

The IC device with a mounted secondary battery of this aspect is particularly suitable for ICs used in intermittent operation modes, such as IoT modules and environmental sensors. If a predetermined task is completed in one cycle of intermittent operations in such an IC, there is no need to rush a series of operations. Even if the entire operation time (including the charging time) is long due to divisional execution of one task that is to be processed with a current pulse having a predetermined width, there is no actual damage. For example, in the case of an IoT module or environment sensor, one task may be divided into small elements, such as sensing, data processing, transmission, and reception, and each element is intermittently performed with charging interposed therebetween. Accordingly, the IC devices of this aspect are particularly suitable for applications of IoT module microcomputers (especially, those having a volatile memory such as SRAM) and IoT module wireless communication devices (for example, Bluetooth Low Energy (BLE) devices).

Any all-solid-state lithium secondary battery may be used, and details thereof will be described later in the section "B. All-solid-state lithium secondary battery". Preferably, the all-solid-state lithium secondary battery functions as a bypass capacitor and thus can supply a temporarily increased peak current in addition to a steady current. As described above, the all-solid-state lithium secondary battery has high heat resistance and is suitable for thinning or miniaturization. The thinned or miniaturized all-solid-state lithium secondary battery is provided with a thin solid electrolyte layer (for example, a solid electrolyte thin film). Such a thin solid electrolyte layer has a large electrostatic capacity of the parasitic capacitance component in the equivalent circuit, so that the parasitic capacitance component can have sufficient electrostatic capacity to function as a bypass capacitor.

FIG. 1 illustrates a typical example of the equivalent circuit of an all-solid-state lithium secondary battery connected to a load (IC). In the equivalent circuit illustrated in FIG. 1, symbols C- and R- represent electrostatic capacity and resistance, respectively, occurring at the interface between the solid electrolyte layer and the negative electrode layer. Symbols $C_{se}$ and $R_{se}$ represent electrostatic capacity and resistance occurring at the solid electrolyte layer, respectively. Symbols $C_+$ and $R_+$ represent electrostatic capacity and resistance, respectively, occurring at the interface between the solid electrolyte layer and the positive electrode layer. Symbol $V_{OC}$ represents open circuit voltage, symbol $R_{HF}$ represents terminal resistance, and symbol W represents diffusion resistance. In the equivalent circuit shown in FIG. 1, a schematic current waveform in the case that an all-solid-state lithium battery (typically an all-solid-state chip battery) responds to an instantaneous high-load operation of the IC represented by the pulse current shown in FIG. 2 (*b*) is as shown in FIG. 2 (*a*). This behavior suggests that the battery exhibits a bypass capacitor function. In particular, the configuration of the all-solid-state lithium secondary battery closely related to the load (IC) causes the terminal resistance $R_{HF}$ to decrease, resulting in an increase in the initial value $V_{OC}/R_{HF}$ of the transient current illustrated in FIG. 2(*a*). As the C calculated by $1/C=(1/C_-)+(1/C_-)+(1/C_+)$ increases, the term of the transient current can be lengthened. In general, an all-solid-state lithium secondary battery operates in a fully charged state and can be recovered to full charge by trickle charge as soon as the pulse current of IC decreases after the operation. Such a bypass capacitor can reduce the power source voltage drop of the IC operating voltage $V_{IC}$, thereby stabilizing the power source for an IC.

According to a preferred aspect of the present invention, the solid electrolyte layer, the interface between the solid electrolyte layer and the negative electrode layer, and the interface between the solid electrolyte layer and the positive electrode layer as a whole have an electrostatic capacity sufficient to allow the all-solid-state lithium secondary battery to function as a bypass capacitor, and the electrostatic capacity is derived from a parasitic capacitance in an equivalent circuit including the power source. The preferable electrostatic capacity as a bypass capacitor to be disposed just proximal to the IC (for example, less than 1 cm) is 0.001 μF to 0.1 μF, more preferably 0.005 μF to 0.05 μF.

The configuration of the all-solid-state lithium secondary battery constituting the power source for an IC will be described in detail in the section: "B. All-solid-state lithium secondary battery". Advantages in addition to the function as a bypass capacitor are as follows:

- High heat resistance of the solid electrolyte layer allows the battery to operate at a high temperature (for example, about 120° C.), which enables the battery to be disposed just proximal to the IC, which also functions as a heating element.
- The battery with high energy density can function as a backup power source for, SRAM, DRAM, RTC, for example.
- Since the leakage is low (i.e., the leakage current barely occurs), the battery capacity can be maintained for a long time even in an unstable power source state such as energy harvesting.

Various preferred aspects that make the most of the advantages (including a function as a bypass capacitor and other optional advantages described above) of the power source for an IC (that is, the all-solid-state lithium secondary battery) will now be described.

According to a preferred aspect of the present invention, as schematically illustrated in FIG. 3, each of the IC chips 4 is accommodated together with the corresponding power source 10 in a case 6 into a form of an IC package provided with a built-in secondary battery 8. That is, the all-solid-state lithium secondary battery 10 is mounted proximal to the IC chip 4 as described above, so that the secondary battery 10 can be built in the IC package 8. Furthermore, since the power source for an IC 10 itself can also function as a bypass capacitor, the IC package provided with a built-in secondary battery 8 preferably includes no bypass capacitor in an area within 1 cm from the outer edge of the IC chip 4. More preferably, the IC package 8 provided with a built-in secondary battery includes no bypass capacitor. It is preferred that the IC package 8 include a printed wiring board 2, on which the IC chip 4 and the power source for an IC 10 are mounted in sequence. In this case, the IC chip 4 and the power source for an IC 10 are preferably connected to the printed wiring board 2 with bonding wires 5, respectively, and the IC package 8 (in particular, the printed wiring board 2) can be mounted on a larger printed wiring board 2' through bumps 9. In other words, the printed wiring boards 2 and 2' are electrically connected by bumps 9. An exemplary package is a ball grid array (BGA).

Another preferred aspect of the present invention, as schematically shown in FIGS. 4 and 6, provides an all-solid-state lithium secondary battery 10 disposed as an inner layer of the printed wiring board 2 or 2' directly below the IC chip 4. Furthermore, the power source for an IC 10 itself can also function as a bypass capacitor; hence, the IC substrate provided with a built-in secondary battery 1 preferably includes no bypass capacitor in an area within 1 cm from the outer edge of the IC chip 4. More preferably, the IC substrate provided with a built-in secondary battery 1 includes no bypass capacitor. As shown in FIGS. 4 and 6, the IC chip 4 is preferably connected to the printed wiring board 2 by a bonding wire 5, and the IC package 8' or 8''' including the printed wiring board 2 can be mounted on a larger printed wiring board 2' through bumps 9. In other words, the printed wiring boards 2 and 2' are electrically connected by bumps 9. An exemplary package is a ball grid array (BGA).

The battery management unit (BMU) is an example of the battery controller mounted on an IC substrate with a mounted secondary battery. A typical BMU controls the charge and discharge of a secondary battery (charge from an external power source and discharge to a load) to prevent overcharge and overdischarge. The following applications and advantages of the BMU are conceivable:

1) Application involving steady power supply to the load: The user can control the battery with a commercially available lithium battery control IC. An example of this application is an external power source shown in FIG. 7.

2) Application performing transient power supply control: For example, substitutional application for a chip capacitor power source. In this case, compatibility can be achieved between the system operation sequence involving a sudden change in current in response to the clock and the battery characteristics. A preferred example of this application is an on-board microcomputer power source shown in FIG. 7.

In this respect, the power source for an IC of the present invention is preferably used for the above application 2) because it can be mounted just proximal to the IC.

A preferred battery controller (typically, BMU) accordingly supplies the peak current from the all-solid-state lithium secondary battery to the IC to respond to an instantaneous high load operation of the IC and charges the all-solid-state lithium secondary battery after the high-load operation. In this manner, the power source for an IC also functions as a bypass capacitor to reduce the drop of the IC operating voltage $V_{IC}$ as shown in FIG. 2 (c), leading to further stabilization of the power source for an IC.

FIG. 8 schematically illustrates the overall configuration of the system including the battery controller. The system illustrated in FIG. 8 includes an external power source 100, a battery controller 102, an all-solid-state lithium secondary battery 10, an optional DC/DC converter 108, and an IC 110. The battery controller 102 is disposed between the external power source 100 and the all-solid-state lithium secondary battery 10 and includes a charger-cum-protect IC 104 and a switch 106. The secondary battery 10 is connected to the battery controller 102 via the switch 106 and supplies power to the IC 110 either through or not through the DC/DC converter 108. Under the control of the charger-cum-protect IC 104, the switch 106 can be turned on at desired timing, for example, only when a desired voltage is detected from the external power source 100, thereby supplying a charge current to the secondary battery 10. In particular, the battery controller 102 preferably controls the timing of charge/discharge (charge and discharge sequence) so as to charge the secondary battery 10 during the sleep mode of the IC other than the high load current of the IC 110. Such control achieves the high-load operation of the IC 110 and the charge of the secondary battery 10 with high efficiency without interference therebetween. The external power source 100 may be a normal power source for external charging, a solar (photovoltaic: PV) cell stack or energy harvesting (EH). It should be noted that a circuit protection IC for detecting a drop in the input voltage of the DC/DC converter 108 may be disposed upstream of the DC/DC converter 108. The IC 110 preferably requires the operation of a pulsed current at a low voltage. Examples of such an IC include ICs for IoT modules and environmental sensors.

A4. Rapid Charge and Discharge Application

Figure 9:
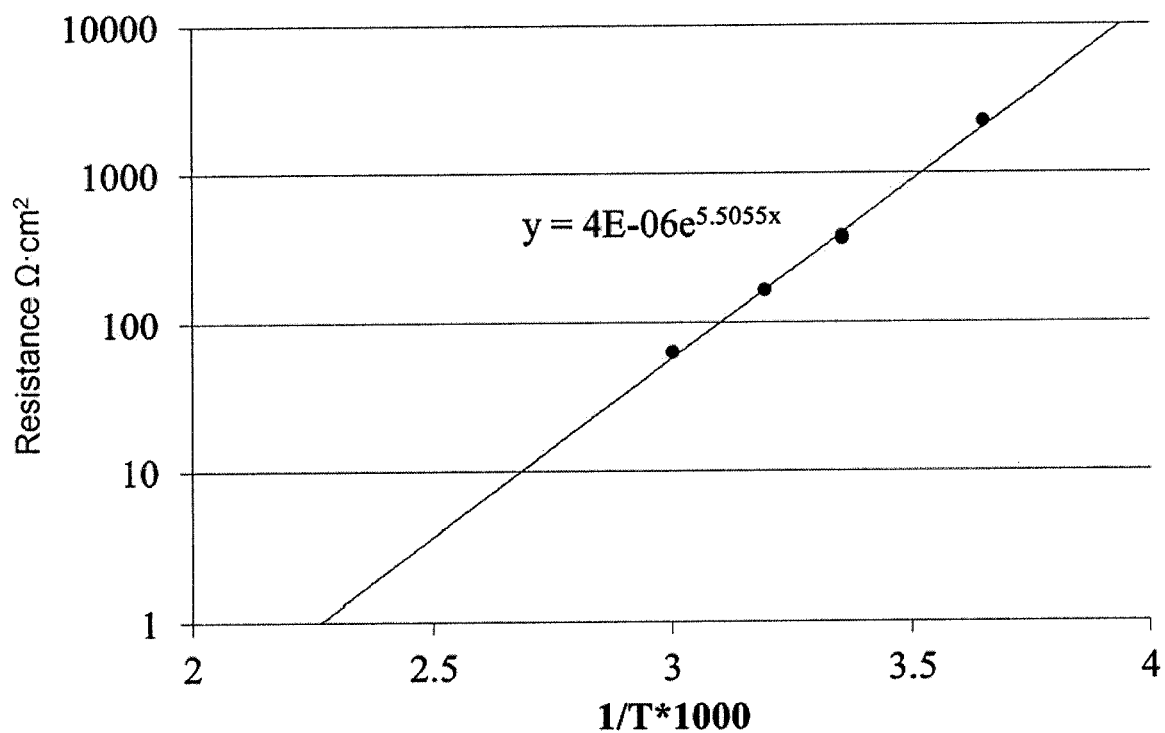
FIG. 9 is a graph illustrating an Arrhenius plot on an all-solid-state lithium secondary battery.
Figure 10:
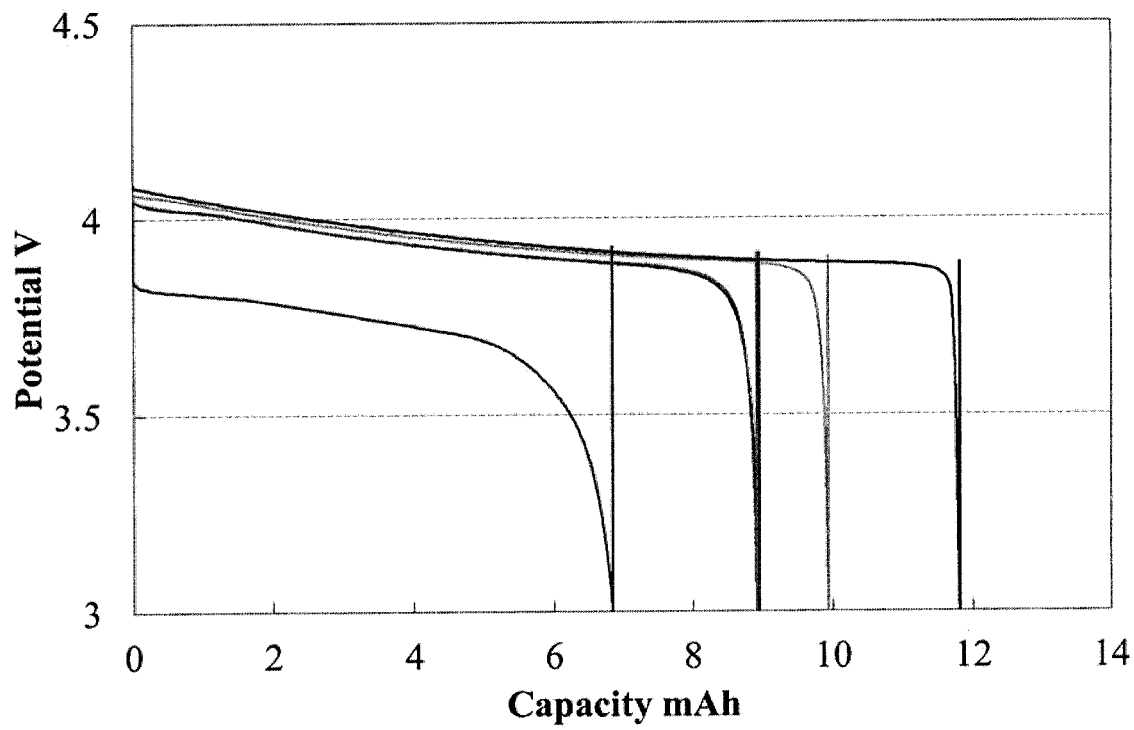
FIG. 10 is a diagram showing potential-capacity characteristics measured to depict the Arrhenius plot shown in FIG. 8.
Figure 11:
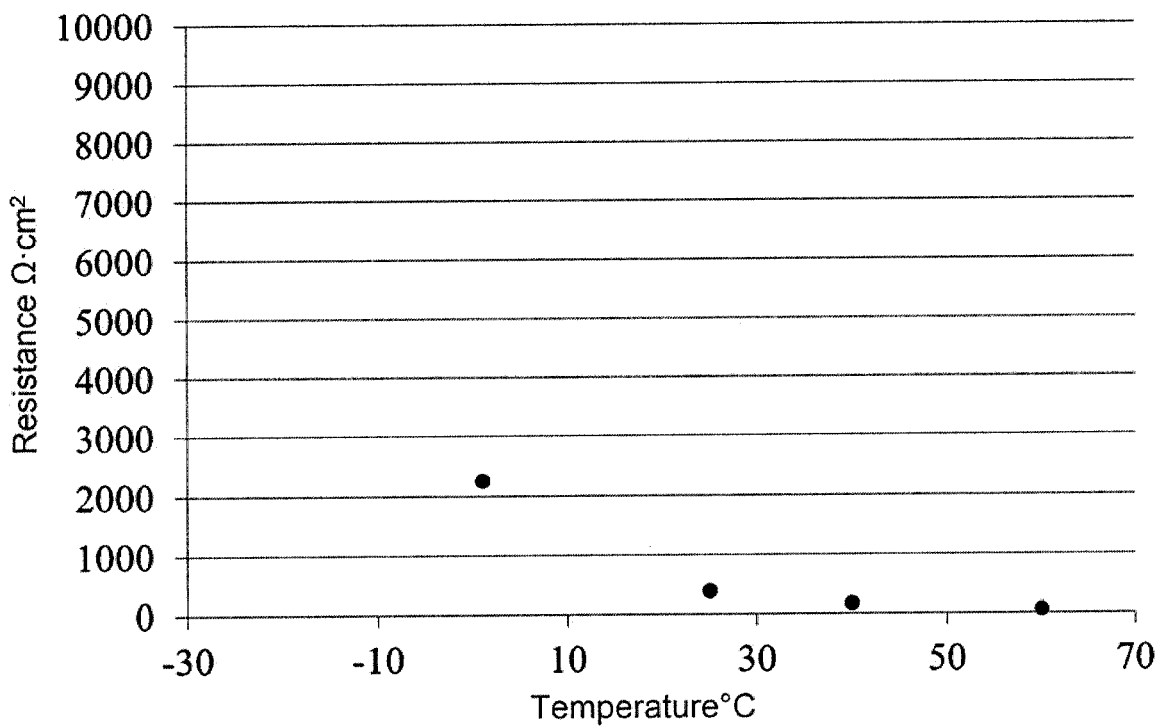
FIG. 11 is a graph plotting the relation between temperature (0° C., 25° C., 40° C., and 60° C.) and resistance corresponding to the Arrhenius plot shown in FIG. 8.

All-solid-state lithium batteries typically can operate at high temperatures up to 120° C. The advantage of this high heat resistance enables all-solid-state lithium secondary batteries to charge and discharge more promptly. More specifically, the internal impedance component other than the diffusion resistance in the equivalent circuit of the all-solid-state lithium battery conforms to the Arrhenius equation as shown in FIG. 9, and thus the internal impedance of the battery decreases with the temperature. For reference, FIG. 10 shows potential-capacity characteristics measured to depict the Arrhenius plot shown in FIG. 9. FIG. 11 is a graph plotting the relation between the temperature (0° C., 25° C., 40° C., and 60° C.) and the resistance corresponding to the Arrhenius plot shown in FIG. 9. For example, the internal impedance, expressed as the sheet resistance per unit area, measured in the all-solid-state lithium secondary battery including a LiPON solid electrolyte layer having a thickness of 3 μm decreases with the temperature as shown in FIG. 11: 387 Ω·cm² at room temperature 25° C., 166 Ω·cm² at 40° C. and 63 Ω·cm² at 60° C. In order to positively utilize these characteristics, a means for monitoring the temperature of the battery is provided. As a result, the following functions can be employed:

i) A charging sequence of the battery in a high heat state immediately after IC operation can be set to perform rapid charge; and ii) A heater including, for example, resistive wiring can be provided to heat the battery and thus to perform rapid charge or high-output-current discharge of the battery. In particular, Function ii) outputs a high rate discharge current as a "battery" in addition to the instantaneous output current by the parasitic bypass capacitor of the all-solid-state lithium secondary battery, leading to further stabilization of the power source voltage of the IC.

Figure 12:
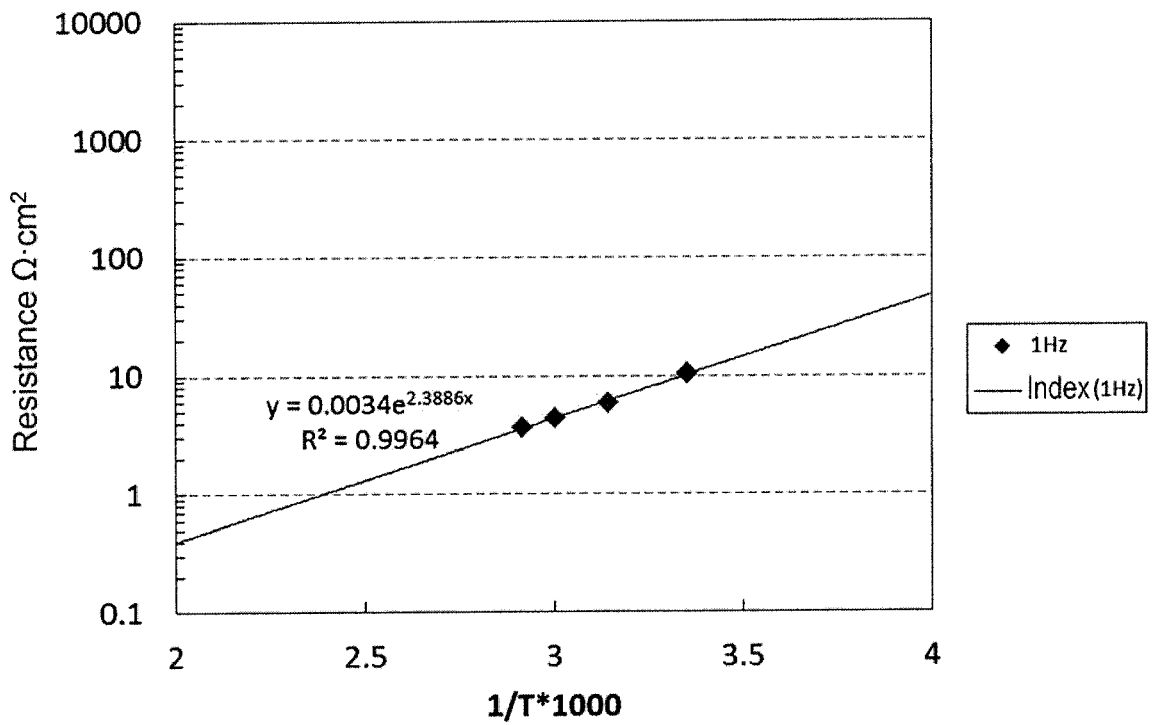
FIG. 12 is a graph illustrating an Arrhenius plot on a lithium ion secondary battery containing an ionic liquid as an electrolytic solution.

Similar concepts can be applied not only to an all-solid-state lithium secondary battery but also to a lithium ion secondary battery containing an ionic liquid as an electrolytic solution. An Arrhenius plot according to the Arrhenius equation as shown in FIG. 12 is also depicted in a lithium ion secondary battery using an ionic liquid as an electrolytic solution. The internal impedance expressed as the sheet resistance per unit area in the lithium ion secondary battery other than the diffusion resistance in the equivalent circuit decreases with the temperature: 10 Ω·cm² at room temperature 25° C., 6 Ω·cm² at 45° C. and 4 Ω·cm² at 60° C. In order to positively utilize this characteristic, a monitoring means can be provided on the battery for monitoring the temperature of the battery to achieve Functions i) and ii).

Accordingly, a preferred embodiment corresponding to Function i) provides a method of promoting charge of an all-solid-state lithium secondary battery or a lithium ion secondary battery comprising an ionic liquid as an electrolytic solution used as a power source for an IC, comprising performing the charge of the all-solid-state lithium secondary battery or the lithium ion secondary battery selectively in a high-temperature state immediately after an IC operation, thereby promoting the charge of the battery. Furthermore, a preferred embodiment corresponding to Function ii) provides a method of promoting the charge of an all-solid-state lithium secondary battery or a lithium ion secondary battery comprising an ionic liquid as an electrolytic solution used as a power source for an IC, comprising intentionally heating the secondary battery with a heater or resistance wiring disposed in a circuit including an IC, thereby promoting the charge and discharge of the battery.

<IC Package Provided with a Built-in Secondary Battery Suitable for Rapid Charge and Discharge>

It is preferred that heating of the power source for an IC for rapid charge and discharge as described above be carried out by a) heat generated by the internal resistance of the power source for an IC during operation of the IC chip, and/or b) heat generated in the IC chip during operation of the IC chip. Thus, the surface resistance of the battery can be reduced by effectively heating the power source for an IC by the exhaust heat of the IC chip without providing a heating means such as a heater. Accordingly, not only rapid charge and discharge can be achieved but also the number of parts can be reduced, which contributes to miniaturization and cost reduction of IC products. In any of the heat a) and b), the generated heat is directly or indirectly transmitted to the power source for an IC to heat or maintain the power source for an IC at a predetermined operation temperature suitable for rapid charge/discharge. Such a method can be desirably achieved in an IC package provided with a printed wiring board, an IC chip, and a power source for an IC (i.e., an IC package provided with a built-in secondary battery) as described below. The dissipation of heat generated in the IC package can be reduced by the heat insulating property of the IC package itself (e.g., heat insulating property of the case and/or the printed wiring board) accommodating the heat source (IC chip or power source for an IC).

Incidentally, the power source for an IC is not sufficiently heated at the initial operation. However, as shown in the equivalent circuit of FIG. 8, the power source for an IC can pass instantaneous high output current at the initial operation due to transient phenomenon. During this time, the IC chip 4 operates to generate heat, and the heat is transferred to the power source for an IC to heat the power source for IC to a predetermined operation temperature suitable for rapid charge and discharge. At the same time, the power source for an IC can also be heated by heat generation due to the internal resistance of the power source for an IC during operation of the IC chip. Accordingly, the internal impedance of the power source for an IC can always be kept low during the entire process from the initial operation time to the steady operation time, resulting in constant supply of the high rate current.

In the case where the power source for an IC is an all-solid-state lithium secondary battery, it is preferred that the IC package provided with a built-in secondary battery have a function of raising or holding the operating temperature of the power source for an IC to 40 to 120° C. (desirably 60 to 120° C.) by means of a) heat generated by the internal resistance of the power source for an IC during an operation of the IC chip or b) transferring heat generated in the IC chip to the power source for an IC during an operation of the IC chip. As described above, for example, the internal impedance measured in the all-solid-state lithium secondary battery including a LiPON solid electrolyte layer having a thickness of 3 μm decreases with the temperature as shown in FIG. 11: 387 $\Omega \cdot cm^2$ at room temperature 25° C., 166 $\Omega \cdot cm^2$ at 40° C. and 63 $\Omega \cdot cm^2$ at 60° C., expressed as the sheet resistance per unit area. Accordingly, setting the operating temperature of an all-solid-state lithium secondary battery to 40 to 120° C. (desirably 60 to 120° C.) enables remarkably rapid charge and discharge.

Accordingly, in the case where the power source for an IC is an all-solid-state lithium secondary battery, a preferred aspect of the present invention provides a method of using an IC chip and a power source for an IC, comprising the steps of providing an IC package having a printed wiring board, an IC chip, and a power source for an IC; and raising or holding the operating temperature of the power source for an IC to 40 to 120° C. (desirably 60 to 120° C.) due to heat generated by the internal resistance of the power source for an IC during an operation of the IC chip. Another preferred aspect of the present invention provides a method of using an IC chip and a power source for an IC, comprising the steps of providing an IC package having a printed wiring board, an IC chip, and a power source for an IC; and raising or holding the operating temperature of the power source for an IC to 40 to 120° C. (desirably 60 to 120° C.) by transfer of heat generated in the IC chip to the power source for an IC during an operation of the IC chip.

In the case where the power source for an IC is a lithium ion secondary battery containing an ionic liquid as an electrolytic solution (hereinafter referred to as an ionic liquid lithium ion secondary battery), it is preferred that the IC package provided with a built-in secondary battery have a function of raising or holding the operating temperature of the power source for an IC to 40 to 85° C. a) due to heat generated by the internal resistance of the power source for an IC during an operation of the IC chip or b) by transferring heat generated in the IC chip to the power source for an IC during an operation of the IC chip. As described above, for example, the internal impedance expressed as the sheet resistance per unit area in the lithium ion secondary battery except for the diffusion resistance in the equivalent circuit decreases with temperature: 10 $\Omega \cdot cm^2$ at room temperature 25° C., 6 $\Omega \cdot cm^2$ at 45° C. and 4 $\Omega \cdot cm^2$ at 60° C. Accordingly, setting the operating temperature of the ionic liquid lithium ion secondary battery to 40 to 85° C. enables remarkably rapid charge and discharge.

A preferred aspect of the present invention in the case where the power source for an IC is an ionic liquid lithium ion secondary battery provides a method of using an IC chip and a power source for an IC, the method comprising the steps of providing an IC package having a printed wiring board, an IC chip, and a power source for an IC; and raising or holding the operating temperature of the power source for an IC to 40 to 85° C. due to heat generated by the internal resistance of the power source for an IC during an operation of the IC chip. Another aspect of the present invention provides a method of using an IC chip and a power source for an IC, comprising the steps of providing an IC package having a printed wiring board, an IC chip, and a power source for an IC; and raising or holding the operating temperature of the power source for an IC to 40 to 85° C. by transfer of heat generated in the IC chip to the power source for an IC during an operation of the IC chip.

In either case of the all-solid-state lithium secondary battery or the ionic liquid lithium ion secondary battery for the power source for an IC, it is preferred that the operating temperature of the power source for an IC be raised or held by the heat insulation of the IC package itself (e.g., heat insulation of the case and/or the printed wiring board) accommodating the heat source (IC chip or power source for an IC). It is accordingly preferred that the case and/or the printed wiring board have high heat insulation. An exemplary preferred material for such a case (that is, a heat insulating member) is a resin composition containing an epoxy resin as a matrix resin and a silica filler. An exemplary preferred insulating material for such a printed wiring board is glass-epoxy (FR-4).

Figure 13:
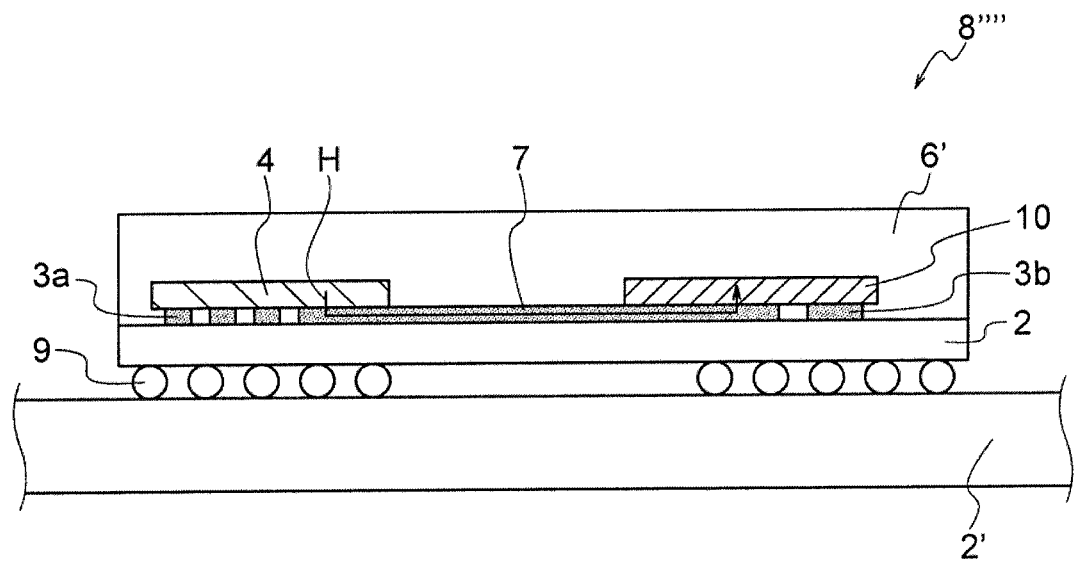
FIG. 13 is a schematic cross-sectional view of an IC package suitable for rapid charge and discharge in which a power source for an IC and the IC chip of the printed wiring board are mounted on the same plane.
Figure 14:
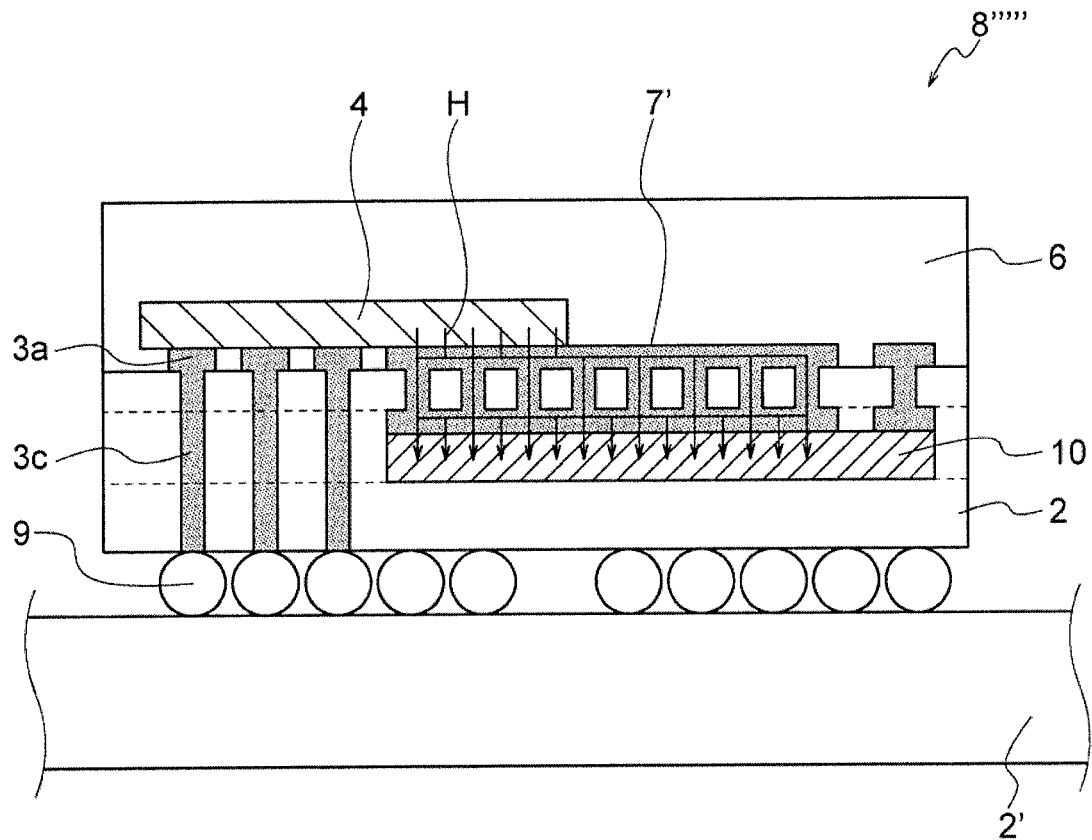
FIG. 14 is a schematic cross-sectional view of an IC package suitable for rapid charge and discharge in which a power source for an IC is mounted as an inner layer of a printed wiring board directly under an IC chip.

In the IC packages 8'''', 8''''', it is preferred that the IC chip 4 and the power source for an IC 10 be electrically connected with a thermally electrically conductive member 7 and the heat H generated in the IC chip 4 during the operation of the IC chip 4 be transferred to the power source for an IC 10 through the thermally electrically conductive member 7, as shown in FIGS. 13 and 14 described later in detail, in either case of the all-solid-state lithium secondary battery or the ionic liquid lithium ion secondary battery for the power source for an IC. The thermally electrically conductive member 7 is preferably a ground plane. Since the ground plane, which is a thermally electrically conductive member 7 in FIGS. 13 and 14 connected to various electronic components with a wide contact area so as to significantly lower the resistance, can efficiently transfer the heat H generated in the IC chip 4 to the power source for an IC 10; hence, the ground plane can provide an excellent heat transfer path. It is preferred that the thermally electrically conductive member 7 or ground plane be composed of a conductive material having high thermal conductivity. A preferred example of such a material is a copper foil.

FIG. 13 illustrates an example of an IC package suitable for rapid charge and discharge in which a power source for an IC and the IC chip of the printed wiring board are mounted on the same plane. In the IC package provided with a built-in secondary battery 8'''' illustrated in FIG. 13, the IC chip 4 and the power source for an IC 10 are mounted on the same face of the printed wiring board 2, and the IC chip 4 and the power source for an IC 10 are accommodated in a heat insulating member 6', whereby heat dissipation from the IC chip 4 and the power source for an IC 10 is reduced. In FIG. 13, the IC chip 4 is mounted on the printed wiring board 2 via a signal wiring 3a, while the power source for an IC 10 is mounted on the printed wiring board 2 via a power wiring 3b. The IC package 8'''' including the printed wiring board 2 can be mounted on a larger printed wiring board 2' through bumps 9. In other words, the printed wiring boards 2 and 2' are electrically connected by the 9. An exemplary package is a ball grid array (BGA). As described above, the IC chip 4 and the power source for an IC 10 are connected via the ground plane as the thermally electrically conductive member 7, and this ground plane serves as a heat transfer path. In this way, the heat H generated in the IC chip 4 is efficiently transferred to the power source for an IC 10. The power source for an IC 10 is thereby heated or maintained at the operating temperature by the heat transfer. From this viewpoint, it is preferred that the heat insulating member 6' for packaging the IC chip 4 and the power source for an IC 10 be composed of a material having high heat insulating properties. An example of such a material is a resin composition including an epoxy resin as a matrix resin and a silica filler. In the configuration shown in FIG. 13, the power source for an IC 10 and the IC chip 4 are mounted on the same plane, so that they can be accommodated with the same heat insulating member 6'. In other words, an IC package provided with a built-in secondary battery suitable for rapid charge and discharge can be advantageously provided with a simple configuration and low cost.

FIG. 14 illustrates an example of an IC package suitable for rapid charge and discharge in which a power source for an IC is mounted as an inner layer of a printed wiring board directly under an IC chip. In the IC package provided with a built-in secondary battery 8'''' illustrated in FIG. 14, the power source for an IC 10 is disposed, as an inner layer of the printed wiring board 2, directly below an IC chip, and heat radiation from the power source for an IC 10 is reduced by the heat insulation of the printed wiring board 2. In FIG. 14, the IC chip 4 is mounted on the printed wiring board 2 via the signal line 3a and an optional through via 3c, while the power source for an IC 10 is mounted on the printed wiring board 2 via the ground plane being the thermally electrically conductive member 7. The IC package 8'''' including the printed wiring board 2 can be mounted on a larger printed wiring board 2' through bumps 9. In other words, the printed wiring boards 2 and 2' are electrically connected by bumps 9. An exemplary package is a ball grid array (BGA). As described above, the IC chip 4 and the power source for an IC 10 are connected via the ground plane as thermally electrically conductive member 7', and this ground plane serves as a heat transfer path. In this way, the heat H generated in the IC chip 4 is efficiently transferred to the power source for an IC 10. The power source for an IC 10 is heated or maintained at the above-described operating temperature by the heat transfer. From this viewpoint, it is preferred that the printed wiring board 2 into which the power source for an IC 10 be disposed as an inner layer includes a highly heat insulating material. Examples of such a heat insulating material include glass-epoxy (FR-4). In the configuration shown in FIG. 14, the power source for an IC 10 is disposed as an inner layer of the printed wiring board 2 directly below the IC chip 4. In other words, the power source for an IC 10 and the IC chip 4 are disposed at different heights in the vertical direction. The power source for an IC 10 and the IC chip 4, therefore, can be accommodated with different materials. Accordingly, the power source for an IC 10 can be incorporated in the printed wiring board 2 including a highly heat insulating material, while the IC chip 4 can be accommodated with the case 6 having properties suitable for IC characteristics. That is, there is advantageously provided a high performance IC package provided with a built-in secondary battery customized for heat dissipation/heat insulation for each of the IC chip 4 and the power source for an IC 10. In this case, the case 6 for accommodating the IC chip 4 can be freely designed so as to be suitable for IC characteristics, and is not necessarily a heat insulating material, so that it may be designed so as to enhance the heat dissipation like conventional IC packages requiring heat dissipation. For example, a preferred constituent material of the case 6 for packaging the IC chip 4 may be a composition containing a filler having high thermal conductivity, such as alumina, silicon nitride, or aluminum nitride, according to IC characteristics.

It should be appreciated that the preferred aspects described above with reference to FIGS. 13 and 14 is applicable to any case where the power source for an IC is either an all-solid-state lithium secondary battery or an ionic liquid lithium ion secondary battery.

B. All-Solid-State Lithium Secondary Battery

Figure 15:
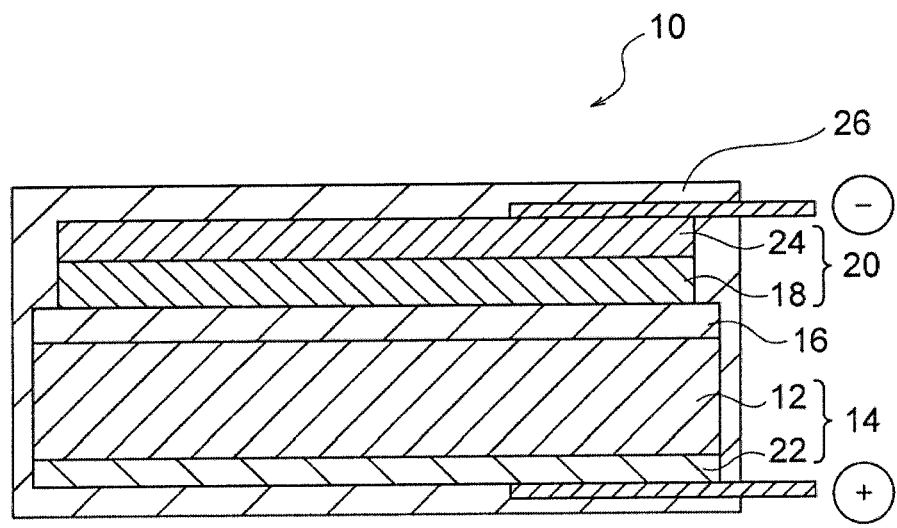
FIG. 15 is a schematic cross-sectional view illustrating an exemplary all-solid-state lithium secondary battery.

Any all-solid-state lithium secondary battery may be used, but as described above, it is preferred that the all-solid-state lithium secondary battery behave as a by-pass capacitor. FIG. 15 schematically illustrates an example of an all-solid-lithium secondary battery. As shown in FIG. 15, the all-solid-state lithium secondary battery 10 includes a positive electrode layer 14, a solid electrolyte layer 16, and a negative electrode layer 20. The positive electrode layer 14 preferably contains a lithium composite oxide having a layered rock salt structure as the positive electrode active material 12. Preferably, the solid electrolyte layer 16 includes a lithium ion conducting material. The negative electrode layer 20 preferably contains lithium as the negative electrode active material 18. As disclosed in Patent Document 4 (WO 2015/170545), an all-solid-state lithium secondary battery can have superior characteristics, i.e., a large capacity and a high energy density. Accordingly, the all-solid-state battery can have high safety, large capacity, and a high energy density in spite of its relatively thin or small size. Specifically, the all-solid-state lithium secondary battery 10 has a thickness of preferably 10 to 5000 µm, more preferably 10 to 1000 µm, further preferably 10 to 500 µm, particularly preferably 100 to 500 µm. Furthermore, the all-solid-state lithium secondary battery 10 has longitudinal and transverse dimensions in a range of 1 to 50 mm, more preferably 1 to 20 mm, further preferably 1 to 10 mm, particularly preferably 3 to 7 mm. The all-solid-state lithium secondary battery preferably has an energy density of 10 to 700 Wh/L, and more preferably 100 to 700 Wh/L.

The relatively thin or compact all-solid-state lithium secondary battery 10 having large capacity and high energy density of the present invention can be advantageously used in various fields that have rejected or have not anticipated practical application of conventional all-solid-state batteries. This is because the all-solid-state battery in the present invention has various advantageous characteristics, such as high-level safety (due to the elimination of flammable electrolytic solutions), high heat resistance (operable at, for example, 80° C. or higher), and long service life (due to the elimination of electrolytic solutions, which deteriorate in high-temperature environments) in addition to large capacity and high energy density (resulting in a reduction in thickness or height). An all-solid-state cell stack of unit cells can provide a high voltage battery. Accordingly, the best use of the advantages of these all-solid-state lithium secondary batteries can provide various applications in various forms more closely related to the integrated circuit (IC) as described above.

(1) Positive Electrode Active Material

The positive electrode layer 14 preferably includes a positive electrode active material 12 composed of a lithium composite oxide having a layered rock salt structure. In detail, the grains contained in the positive electrode active material 12 are preferably composed of a lithium transition metal oxide having a layered rock salt structure. The layered rock salt structure has desirable characteristics in that the oxidation-reduction potential decreases due to intercalation of lithium ions whereas the oxidation-reduction potential increases due to deintercalation of lithium ions. In particular, preferred is a composition containing a large amount of Ni. The layered rock-salt structure is a crystal structure including transition metal layers and lithium layers that are alternately stacked with oxygen-atom layers disposed therebetween, i.e., a crystal structure including ionic transition metal layers and ionic lithium layers that are alternately stacked with oxide ions disposed therebetween (typically an α-NaFeO$_2$ structure of transition metal and lithium regularly arrayed in the [111] axis direction of a cubic rock-salt structure). Typical examples of lithium-transition metal complex oxide having a layered rock-salt structure include lithium nickelate, lithium manganate, lithium nickel manganate, lithium nickel cobaltate, lithium cobalt nickel manganate, and lithium cobalt manganite. These materials may further contain one or more other elements, such as Mg, Al, Si, Ca, Ti, V, Cr, Fe, Cu, Zn, Ga, Ge, Sr, Y, Zr, Nb, Mo, Ag, Sn, Sb, Te, Ba, and Bi. A particularly preferred lithium composite oxide is lithium cobaltate.

The positive electrode active material 12 is preferably a crystallographically oriented positive electrode plate composed of oriented polycrystalline aggregation (crystallographically oriented sintered bodies) made of a plurality of lithium transition metal oxide grains. In this case, the crystallographically oriented positive electrode plate (oriented polycrystalline aggregation) of the positive electrode active material 12 can be readily thickened compared to the crystallographically non-oriented positive electrode plate (non-oriented polycrystalline aggregation). The crystallographically oriented positive electrode plate has a thickness of preferably 5 μm or more, more preferably 10 μm or more, and further preferably 25 μm or more from the viewpoint of increasing the active material capacity per unit area. Although the thickness has no upper limit, it is practically 500 μm or less, more practically it is 200 μm or less, and still more practically it is 100 μm or less. The crystallographically oriented positive electrode plate of the positive electrode active material 12 has longitudinal and transverse dimensions in a range of preferably 1 to 50 mm, more preferably 1 to 20 mm, further preferably 1 to 10 mm, particularly preferably 3 to 7 mm.

The crystallographically oriented positive electrode plate may be a single or multiple oriented layer configuration composed of positive electrode active material 12.

The lithium transition metal oxide grains constituting the crystallographically oriented positive electrode plate are preferably have a platy shape with a thickness of about 2 to 100 μm. More preferably, the (003) plane be oriented in the direction from the positive electrode layer 14 toward the negative electrode layer 20. This can discharge a large number of lithium ions at the time of high input (charge) and can receive a large number of lithium ions at the time of high output (discharge) without precluding intercalation or deintercalation of lithium ions into or from the positive electrode active material 12. Planes other than the (003) plane, for example, the (101) and (104) planes may be oriented along the plate face of the positive electrode active material 12. The details of the grains and the crystallographically oriented positive electrode plate are described in Patent Document 4 (WO2015/170545), the disclosure content of which is hereby incorporated by reference.

Alternatively, the (003) plane of the lithium transition metal oxide grains (hereinafter referred to as crystal grains) contained in the positive electrode plate may be oriented parallel to the face of the positive electrode plate. In this case, it is not necessary that all the crystal grains in the crystallographically oriented positive electrode plate are parallel to each other, but it is preferred that most of them be parallel to each other. Herein, the term "parallel" in this specification is not limited to perfect parallel (that is, 0°), but also includes an angle that can be said to substantially parallel, indicating that the angle between the plate face and the (003) plane is typically within 30°, more typically within 25°, more typically within 20°, particularly typically within 15°, particularly typically within 10°, and most typically within 5°. In the layered rock-salt structure lithium composite oxide, the interlayer distance increases with deintercalation of lithium ions. Accordingly, in the crystallographically oriented positive electrode plate composed of the positive electrode active material 12, the (003) plane parallel to the plate face can reduce an expansion in the planar direction of the crystallographically oriented positive electrode plate due to the deintercalation of lithium ions. Consequently, the tensile stress applied to the solid electrolyte layer 16 due to the expansion and shrinkage of the crystallographically oriented positive electrode plate at the time of charge and discharge is reduced, resulting in prevention of electrical short-circuiting or an increase in resistance due to breakage, peeling or cracking of the solid electrolyte layer 16, which leads to an improvement in cycle characteristics. The orientation of each crystal grain contained in the crystallographically oriented positive electrode plate can be analyzed by electron beam backscatter diffraction (EBSD). The average value of the orientation angles of crystal grains (primary grains) (hereinafter referred to as "average orientation angle") is more than 0° to 30° or less. The average orientation angle of crystal grains or primary grains is determined by the arithmetic average of the orientation angles of about 30 primary grains selected by the method described later in the EBSD image in the cross section of the crystallographically oriented positive electrode plate. The average orientation angle of the primary grains is preferably 30° or less, more preferably 25° or less, in consideration of a further improvement in rate characteristics. The average orientation angle of the primary grains is preferably 2° or more, more preferably 5° or more, also in consideration of rate characteristics. The observation magnification is determined such that about 30 primary grains are contained in an image field, and the average degree of orientation is calculated from all primary grains outer peripheries of which are completely contained in the EBSD image in the cross section of the positive electrode plate. It should be noted that primary grains having a maximum Feret diameter of less than 0.5 µm are eliminated. In analysis of the cross section of the crystallographically oriented positive electrode plate by electron beam backscatter diffraction (EBSD), the total area of crystal grains with an angle of more than 0° to 30° or less of the (003) plane to the plate face is 70% or more of the total area of all the crystal grains included in the cross section. In other words, the total surface area of the primary grains having an orientation angle of more than 0° to 30° or less (hereinafter referred to as "low-angle primary grains") is preferably 70% or more of the total area of all the primary grains used in the calculation of the average orientation angle, in the EBSD image. The proportion of primary grains exhibiting high mutual adhesion thereby increases, resulting in further enhanced rate characteristics. The total surface area of low-angle primary grains to the total surface area of the 30 primary grains used in the calculation of the average orientation angle is preferably more than 70%, and still more preferably 80% or more in view of a further enhancement in the rate characteristics. It is more preferred that the total surface area of the low angle primary grains having an orientation angle of 20° or less be 50% or more of the total area of the 30 primary grains used in the calculation of the average orientation angle. Furthermore, it is more preferred that the total surface area of the low angle primary grains having an orientation angle of 10° or less be 15% or more to the total area of the 30 primary grains used in the calculation of the average orientation angle.

(2) Solid Electrolyte Layer

The lithium-ion conductive material of the solid electrolyte layer 16 is preferably a garnet ceramic material, a nitride ceramic material, a perovskite ceramic material, a phosphate ceramic material, a sulfide ceramic material, or a polymer material, and more preferably at least one selected from the group consisting of a garnet ceramic material, a nitride ceramic material, a perovskite ceramic material, and a phosphate ceramic material. Examples of the garnet ceramic material include a Li—La—Zr—O material (specifically, $Li_7La_3Zr_2O_{12}$), and a Li—La—Ta—O material (specifically, $Li_7La_3Ta_2O_{12}$). Examples of the nitride ceramic material include $Li_3N$. Examples of the perovskite ceramic material include Li—La—Ti—O materials (specifically, $LiLa_{1-x}Ti_xO_3$ (0.04≤x≤0.14)). Examples of the phosphate ceramic material include lithium phosphate, nitrogen-doped lithium phosphate (LiPON), and Li—Al—Ti—P—O, Li—Al—Ge—P—O, and Li—Al—Ti—Si—P—O (specifically, $Li_{1+x+y}Al_xTi_{2-x}Si_yP_{3-y}O_{12}$ (0≤x≤0.4 and 0<y≤0.6)).

A particularly preferred lithium ion conductive material is a garnet ceramic material, which does not react with lithium in the negative electrode even after direct contact. Sintered oxides having a garnet or pseudo-garnet crystal structure containing Li, La, Zr, and O are more preferred because the structure has excellent sintering properties, is readily densified, and has high ion conductivity. The garnet or pseudo-garnet crystal structure having such a composition is called an LLZ crystal structure and has an XRD pattern similar to that in X-ray diffraction file No. 422259 ($Li_7La_3Zr_2O_{12}$) in Cambridge Structural Database (CSD). The structure may contain constituent elements different from those in No. 422259 and may have a Li content in the ceramic different from that in No. 422259, and thus may have diffraction angle and intensity profiles different from those in No. 422259. Preferably, the molar ratio Li/La of Li to La is 2.0 or more and 2.5 or less, and the molar ratio Zr/La of Zr to La is 0.5 or more and 0.67 or less. The garnet or pseudo-garnet crystal structure may further contain Nb and/or Ta. Partial replacement of Zr in LLZ with Nb and/or Ta improves the conductivity in comparison with that before the replacement. Preferably, Zr is replaced with Nb and/or Ta such that the molar ratio (Nb+Ta)/La is 0.03 or more and 0.20 or less. It is preferred that the garnet-based sintered oxide further contain Al, and these elements may be present in the crystal lattice or at positions other than the crystal lattice. Preferably, Al be added in an amount of 0.01 to 1 mass % of the sintered oxide while the molar ratio Al/La of Al to La be 0.008 to 0.12. Such an LLZ-based ceramic is prepared in accordance with a known process described in Patent Document 4 (WO2015/170545) or by appropriately modifying it, the contents of which are incorporated herein by reference.

Another particularly preferred lithium-ion conductive material is a phosphate ceramic material, more preferably nitrogen-doped lithium phosphate (LiPON). LiPON is a group of compounds represented by a composition $Li_{2.9}PO_{3.3}N_{0.46}$, and for example, is a group of compounds represented by $Li_aPO_bN_c$ (wherein, a is 2 to 4, b is 3 to 5, and c is 0.1 to 0.9). $Li_3ClO$ is another particularly preferred lithium ion conductive material.

Although any all-solid-state lithium secondary battery can be used, it is preferred that the all-solid-state lithium secondary battery behave as a by-pass capacitor as described above. In detail, it is preferred that the all-solid-state lithium secondary battery function as a bypass capacitor and thus can supply a temporarily increased peak current in addition to a steady current. From this viewpoint, the material constituting the solid electrolyte layer 16 has a relative dielectric constant $\varepsilon_r$ of preferably 10 to 2000, more preferably from 10 to 700, still more preferably from 10 to 200. The solid electrolyte layer 16 has a thickness of preferably 0.1 to 20 µm, more preferably 1 to 20 µm, further preferably 1 to 5 µm. Furthermore, the solid electrolyte layer 16 has longitudinal and transverse dimensions in a range of preferably 1 to 50 mm, more preferably 1 to 20 mm, further preferably 1 to 10 mm, particularly preferably 3 to 7 mm.

The solid electrolyte layer 16 may be formed by various particle jet coating processes, solid phase processes, solution processes, gas phase processes, or direct bonding processes. Examples of the particle jet coating process include aerosol deposition (AD), gas deposition (GD), powder jet deposition (PJD), cold spraying (CS), and thermal spraying. The aerosol deposition (AD) is particularly preferred because it can be carried out at room temperature without a variation in a composition during the process or formation of a high-resistance layer by the reaction with a positive electrode plate. Examples of the solid phase process include tape lamination processes and print processes. Tape lamination processes are preferred because a thin solid electrolyte layer 16 can be formed and the thickness can be easily controlled. Examples of the solution process include hydrothermal synthesis, sol-gel processes, precipitation processes, micro-emulsion processes, and solvent evaporation processes. Hydrothermal synthesis is particularly preferred among these processes because it can readily yield highly crystalline crystal grains at low temperature. Microcrystals synthesized by these processes may be deposited or directly precipitated on the positive electrode. Examples of the gas phase process include pulsed laser deposition (PLD), sputtering, physical vapor deposition (PVD), chemical vapor deposition (CVD), vacuum deposition, and molecular beam epitaxy (MBE). The laser deposition (PLD) is particularly preferred because it causes a small variation in a composition and readily yields a film having relatively high adhesion. Direct bonding chemically activates the surfaces of a preliminarily formed solid electrolyte layer 16 and positive electrode active material 12 and bonds the surfaces to each other at low temperature. The interface may be activated with plasma or by chemical modification with functional groups, such as hydroxyl groups.

(3) Negative Electrode Active Material

The negative electrode active material 18 may be known negative electrode active materials that can be used in all-solid-state lithium batteries, and preferably contains lithium. Preferred examples of the negative electrode active material 18 include lithium metal, lithium alloys, carbonaceous materials, and lithium titanate (LTO). Preferably, the negative electrode active material 18 is prepared by forming a thin film of lithium metal or an alloy of lithium metal and any other metal on a negative-electrode collector 24 (for example, copper foil) by vacuum deposition, sputtering, or CVD.

The layer of the negative electrode active material 18 preferably has a thickness of 1 μm or more from the viewpoint of ensuring a large total amount of lithium in the all-solid-state lithium secondary battery 10. Furthermore, the layer of the negative electrode active material 18 has longitudinal and transverse dimensions in a range of preferably 1 to 50 mm, more preferably 1 to 20 mm, further preferably 1 to 10 mm, particularly preferably 3 to 7 mm.

(4) Collector

Preferably, the positive electrode layer 14 includes the positive electrode active material 12 and a positive-electrode collector 22 disposed on a face, remote from the solid electrolyte layer 16, of the positive electrode active material 12. Preferably, the negative electrode layer 20 includes the negative electrode active material 18 and the negative-electrode collector 24 disposed on a face, remote from the solid electrolyte layer 16, of the negative electrode active material 18. Examples of the materials of the positive-electrode collector 22 and negative-electrode collector 24 include platinum (Pt), platinum (Pt)/palladium (Pd), gold (Au), silver (Ag), aluminum (Al), copper (Cu), and an indium-tin oxide (ITO) film.

(5) Casing

Any casing 26 may be used that can accommodate a unit cell or multiple unit cells stacked in series or parallel. Since the all-solid-state lithium secondary battery 10 has no risk of leakage of an electrolytic solution, the casing 26 may have a relatively simple form. For example, the casing may be in the form of a chip to be mounted in an electronic circuit or a laminate cell in the application in a thin wide space (for example, a multi-layer aluminum (AD/polypropylene (PP) composite sheet).

Method for Producing Lithium Cobaltate Crystallographically Oriented Sintered Plate The crystallographically oriented positive electrode plate or crystallographically oriented sintered plate used in the all-solid-state lithium battery of the present invention may be produced by any method. For example, Patent Document 4 (WO2015/170545) discloses a method for producing a crystallographically oriented positive electrode plate in which the (003) plane is oriented in a direction from the positive electrode layer 14 to the negative electrode layer 20.

Meanwhile, the crystallographically oriented sintered plate in which the (003) plane is oriented parallel to the plate face of the crystallographically oriented positive electrode plate is manufactured, as exemplified, through (1) preparation of $LiCoO_2$ template particles, (2) preparation of matrix particles, (3) preparation of a green sheet, and (4) preparation of an oriented sintered plate.

(1) Preparation of $LiCoO_2$ Template Particles

A $LiCoO_2$ powder is synthesized by mixing a $Li_2CO_3$ starting powder with a $Co_3O_4$ starting powder and firing (500° C. to 900° C., 1 to 20 hours). The resulting $LiCoO_2$ powder is milled in a ball mill into platy $LiCoO_2$ particles that have a volume-based D50 particle diameter of 0.2 μm to 10 μm and allow lithium ions to migrate parallel to the plate face. Such $LiCoO_2$ particles can be prepared by production of platy crystals, for example, disintegration after grain growth of a green sheet prepared from particulate $LiCoO_2$ slurry, flux growth, hydrothermal synthesis, single crystal growth from a melt, or a sol-gel method. The resulting $LiCoO_2$ particles can be cleaved along a cleavage facet. The $LiCoO_2$ particles are cleaved by disintegration to prepare $LiCoO_2$ template particles.

(2) Preparation of Matrix Particles

A $Co_3O_4$ starting powder is used as matrix particles. The $Co_3O_4$ starting material powder may have any volume-based D50 particle diameter, for example, 0.1 to 1.0 μm. It is preferably smaller than the volume-based D50 particle diameter of the $LiCoO_2$ template particles. The matrix particles can be prepared by thermal treatment of the $Co(OH)_2$ starting material for 1 to 10 hours at 500° C. to 800° C. Furthermore, the matrix particles may also contain $Co(OH)_2$ particles or $LiCoO_2$ particles, in addition to or in place of $Co_3O_4$.

(3) Preparation of Green Sheet

A powder containing a mixture of $LiCoO_2$ template particles and matrix particles in a ratio of 100:3 to 3:97, a dispersing medium, a binder, a plasticizer, and a dispersing agent are mixed. The mixture was degassed with agitation under reduced pressure, and the mixture is adjusted to a desired viscosity to prepare a slurry. Subsequently, the prepared slurry was shaped into a green sheet by a shaping technique capable of applying a shearing force to the $LiCoO_2$ template particles. In this manner, the average orientation angle of each primary particle can be controlled to be more than 0° to 30° or less. A doctor blading is suitable to apply a shearing force to the $LiCoO_2$ template particles. In the doctor blading, a green sheet can be formed by applying the prepared slurry onto a PET film.

(4) Preparation of Crystallographically Oriented Sintered Plate

The green sheet of the slurry is placed on a zirconia setter and is heated (500° C. to 900° C., 1 to 10 hours) to prepare a sintered plate as an intermediate. The sintered plate is then sandwiched between synthesized lithium sheets such that the synthesized lithium sheets have a Li/Co ratio of 1.0, and the laminate is placed on a zirconia setter. The setter is then placed into an alumina sheath. After firing in air (700° C. to 850° C., 1 to 20 hours), the sintered plate is sandwiched between lithium sheets, and subjected to further firing (750° C. to 900° C., 1 to 40 hours) to prepare a $LiCoO_2$ sintered plate. The firing may be performed through two separate steps or a single step. In the case of the two separate steps, the firing temperature at the first step is preferably lower than that at the second step.

EXAMPLES

The present invention will be described in further detail by way of the following examples.

Example A1

An all-solid-state lithium secondary battery 10 having the configuration in FIG. 15 was produced. A positive-electrode active material sheet was produced as a positive-electrode active material 12 that had a layered rock-salt structure, a composition Li(Ni$_{1/3}$Co$_{1/3}$Mn$_{1/3}$)O$_2$ (hereinafter referred to as NCM), and the (003) plane oriented in the direction from a positive electrode layer 14 toward a negative electrode layer 20. A positive-electrode active material sheet having a thickness of 30 μm was prepared. A solid electrolyte layer 16 was formed on the sheet positive-electrode active material 12. A ceramic material having a garnet crystal structure having a composition Li$_7$La$_3$Zr$_2$O$_{12}$ containing Al (hereinafter referred to as LLZ-Al) was used as a lithium-ion conductive material of the solid electrolyte layer 16. The solid electrolyte layer 16 was prepared to have a thickness of 10 μm. A negative-electrode active material 18 having a thickness of 10 μm was prepared with lithium metal. A positive-electrode collector 22 was prepared with aluminum foil having a thickness of 10 μm, and a negative-electrode collector 24 was prepared with copper foil having a thickness of 10 μm. A laminate of these components was produced as a unit cell. The unit cell was packaged by lamination with a multi-layer aluminum (AD/polypropylene (PP) composite sheet. The resultant all-solid-state battery had longitudinal and lateral dimensions of 20 mm and 30 mm, respectively, when viewed from above and a thickness of 0.24 mm.

The produced battery was tested at a charge and discharge mode before the calculation of volumetric-energy density. The battery was tested at a charge mode at a constant current of 1 mA, a charge mode at a constant voltage of 4.1 V, and then a discharge mode at a constant current of 1 mA until the voltage reached 3 V. The observed service capacity (mAh) was 20 mAh. Under assumption of an average discharge voltage of 3.9 V, the volumetric-energy density determined from the following formula (1) was 542 Wh/L:

$$(E \times C)/V \quad (1)$$

where E is a voltage (=3.9 V), C is a capacity (mAh), and V is a battery volume (cm$^3$).

Example A2

The unit cells produced in Example A1 were stacked in parallel to produce a battery having a capacity of 100 mAh. The energy density calculated as in Example A1 was 650 Wh/L.

Example A3

The unit cells produced in Example A1 were stacked in parallel to produce a battery having a capacity of 300 mAh. The energy density calculated as in Example A1 was 750 Wh/L.

Example A4

The unit cell was produced in which the lithium-ion conductive material of a solid electrolyte layer 16 having a thickness of 5 μm was LiPON and the configuration other than that was the same as that in Example A1. The unit cell was packaged by lamination as in Example A1. The resultant all-solid-state battery had longitudinal and lateral dimensions of 20 mm and 30 mm, respectively, when viewed from above and a thickness of 0.24 mm. The resultant all-solid-state battery had a capacity of 20 mAh and a volumetric-energy density of 542 Wh/L by the same calculation as in Example A1.

Example A5

The unit cells produced in Example A4 were stacked in parallel to produce a battery having a capacity of 100 mAh. The energy density calculated as in Example A4 was 650 Wh/L.

Example A6

The unit cells produced in Example A4 were stacked in parallel to produce a battery having a capacity of 300 mAh. The energy density calculated as in Example A1 was 750 Wh/L.

Results

The sizes and performances of the batteries prepared in Examples A1 to 6 are summarized as follows.

TABLE 2

| | Battery size (mm) | Capacity (mAh) | Voltage (V) | Energy density (Wh/L) |
| --- | --- | --- | --- | --- |
| Ex. A1 | 20 × 30 × 0.24 | 20 | 3.9 | 542 |
| Ex. A2 | 20 × 30 × 1.0 | 100 | 3.9 | 650 |
| Ex. A3 | 20 × 30 × 2.6 | 300 | 3.9 | 750 |
| Ex. A4 | 20 × 30 × 0.24 | 20 | 3.9 | 542 |
| Ex. A5 | 20 × 30 × 1.0 | 100 | 3.9 | 650 |
| Ex. A6 | 20 × 30 × 2.6 | 300 | 3.9 | 750 |

The dimensions and performance of the batteries in Table 2 are significantly suitable for various applications including backup power sources for volatile memories in devices such as computers. For reference, the dimensions and performance of the batteries determined, extracted by the applicant, to be desired in several applications including a backup power source for a volatile memory are summarized in Table 3. In the case of a backup power source for a volatile memory, multiple all-solid-state batteries may be disposed on or near (for example, adjacent to) a substrate having the volatile memory mounted thereon and may be connected to the volatile memory in accordance with a required power supply time. It should be understood that the all-solid-state battery of the present invention is significantly promising for various applications including the applications shown in Table 3.

TABLE 3

| Application | Battery size (mm) | Capacity (mAh) | Voltage (V) | Energy density (Wh/L) |
| --- | --- | --- | --- | --- |
| Backup power source for volatile memories | 20 × 30 × 3 | 300 | 3.9 | above 600 |
| Smart card | 20 × 30 × 0.4 | 12 | 3.9 | 200 |
| Agricultural sensor (temperature and humidity sensor) | 20 × 30 × 4 | 6-12 | 3.9 | 10-20 |
| Building diagnosis | 20 × 30 × 4 | 12-60 | 3.9 | 20-100 |
| Radiation monitor | 20 × 30 × 4 | 240 | 3.9 | 400 |
| Smartphone | 30 × 80 × 4 | 2000 | 3.9 | 800 |

Examples B1 to B8

(1) Preparation of LCO Template Particles

Co$_3$O$_4$ starting material powder (volume-based D50 particle size: 0.8 μm, available from Seido Chemical Industry Co., Ltd.) and Li$_2$CO$_3$ starting material powder (volume-based D50 particle size: 2.5 μm, available from Honjo Chemical Corporation) were mixed and fired for 5 hours at 800° C. to 900° C. to synthesize LiCoO$_2$ material powder. At this time, the volume-based D50 particle diameter of the LiCoO$_2$ material powder was adjusted by the heat treatment temperature and the Li/Co ratio, as shown in Table 4.

The resulting LiCoO$_2$ powder was milled to prepare platy LiCoO$_2$ particles (LCO template particles). In Examples B1 to B2 and B4 to B8, a pot mill was used and in Example B3, a wet jet mill was used. At this time, the volume-based D50 particle diameter of the LCO template particles was adjusted by the milling time as shown in Table 4. The aspect ratios of the LiCoO$_2$ template particles are shown in Table 4. The aspect ratios of LiCoO$_2$ template particles were measured by SEM observation of the particles.

(2) Preparation of CoO Matrix Particles

Co$_3$O$_4$ starting material powder (available from Seido Chemical Industry Co., Ltd.) was used as a matrix particle. The volume-based D50 particle diameter of the matrix particles is shown in Table 4. No matrix particles were used in Example B4.

(3) Preparation of Green Sheet

LCO template particles and CoO matrix particles were mixed. The weight ratio of the LCO template particles to CoO matrix particles is shown in Table 4. The weight ratio is 100:0 in Example B4, where matrix particles were not used.

The mixed powder (100 parts by weight), a dispersion medium (toluene:isopropanol=1:1) (100 parts by weight), a binder (polyvinyl butyral: No. BM-2, available from Sekisui Chemical Co., Ltd.) (10 parts by weight), a plasticizer (DOP: di (2-ethylhexyl) phthalate available from Kurogane Kasei Co., Ltd.) (4 parts by weight) and a dispersing agent (product name: RHEODOL SP-O30, available from Kao Corporation) (2 parts by weight) were mixed. The mixture was degassed with agitation under reduced pressure, and the viscosity was adjusted to 400010000 cP to prepare a slurry. The viscosity was measured with an LVT viscometer available from Brookfield, Inc.

The resulting slurry was formed into a sheet on a PET film with a doctor blade at a blade moving rate of 100 m/h to prepare a green sheet having a thickness after drying of 40 μm.

(4) Preparation of Crystallographically Oriented Sintered Plate

The green sheet peeled off from the PET film was placed on a zirconia setter and primarily fired to prepare a Co$_3$O$_4$ sintered plate. As shown in Table 4, the firing conditions in Examples B1 to B6 and B8 were 900° C. and 5 hours and in Example B7, 800° C. and 5 hours.

The Co$_3$O$_4$ sintered plate was sandwiched between the synthesized lithium sheets such that the Li/Co ratio had a value shown in Table 4 and the laminate was placed on a zirconia setter and then secondarily fired to prepare a LiCoO$_2$ sintered plate. In detail, the zirconia setter was placed in an alumina sheath of 90 mm square and kept at 800° C. for 5 hours in the air, then sandwiched between the lithium sheets and sintered at 900° C. for 20 hours.

(5) Preparation of Solid Electrolyte Layer

A lithium phosphate sintered body target having a diameter of 4 inches (about 10 cm) was prepared, and sputtering was executed in a RF magnetron sputtering apparatus (SPF-430H available from Canon Anerva Corporation) using a gas species of N$_2$ at 0.2 Pa and an output of 0.2 kW to form a film with a thickness of 2 μm. In this manner, a LiPON solid electrolyte sputtered film having a thickness of 2 μm was formed on the LiCoO$_2$ sintered plate.

(6) Preparation of Lithium Ion Battery

An Au film having a thickness of 500 Å was formed on the solid electrolyte layer by sputtering in an ion sputtering apparatus (JFC-1500 available from JEOL Ltd).

A tungsten boat loaded with lithium metal was prepared. A vacuum vapor deposition apparatus (carbon coater SVC-700 available from Sanyu Electron Co., Ltd.) was used to vaporize Li by resistance heating and thereby deposit a thin film on the surface of the intermediate layer. At this time, the size of the negative electrode layer was controlled to be 9.5 mm square with a mask such that the negative electrode layer can fit within the 10 mm positive electrode region. A unit cell was thereby prepared in which a negative electrode layer of a Li deposited film having a thickness of 10 μm was formed on the solid electrolyte layer.

A stainless steel foil having a thickness of 20 μm was cut into a 13 mm square positive electrode current collector plate. A 1 mm wide frame-shaped modified polypropylene resin film (thickness 100 μm) having a 13 mm square outer edge and a 11 mm square punched opening was prepared. The frame-shaped resin film was laminated on the outer periphery of the positive electrode current collector plate to form an end-sealed portion by thermal press bonding. The unit cell was placed in a region surrounded by the end-sealed portion on the positive-electrode current collection plate. Stainless steel foil having a thickness of 20 μm was placed on the negative electrode side of the disposed unit cell, and was heated at 200° C. under reduced pressure while a load was applied to the end-sealed portion. In this manner, the end-sealed portion and the upper and lower stainless steel foils were bonded along the entire outer periphery to seal the unit cell, resulting in a sealed all-solid-state lithium battery.

(Observation of Primary Grains Constituting Positive Electrode)

A scanning electron microscope provided with a backscattered electron diffraction image system (FE-SEM, SU 5000, available from Hitachi High-Technologies Corporation, EBSD detector, Nordly Nano available from Oxford Instruments) was used to acquire an EBSD image in a cross section perpendicular to the surface of the positive electrode. The average orientation angle of the primary grains was then calculated by the arithmetic average of the orientation angles of about 30 primary grains arbitrarily selected on the EBSD image under the above conditions. The results of the calculation are shown in Table 5. In all the examples, the angle of the (003) plane of the crystal grains (primary grains) between the plate face was within 30 degrees, more typically within 25 degrees, even more typically within 20 degrees, particularly typically within 15 degrees, particularly typically within 10 degrees, most typically within 5 degrees. It was thereby confirmed that the (003) plane of some crystal grains was oriented parallel to the plate face of the crystallographically oriented positive electrode plate.

The ratio (%) of total surface area of primary grains having an orientation angle of more than 0° to 30° or less to the total area of about 30 primary grains used for calculating the average orientation angle was determined in the EBSD image. The results are shown in Table 5.

(Denseness of Positive Electrode)

A SEM image at 1000 magnification in the cross section of the CP polished positive electrode was binarized. The ratio of the area of the solid phase to the total area of the solid phase and the gas phase on the binarized image was then calculated as a denseness. The results are shown in Table 5.

(Rate Performance)

The lithium ion battery was charged to 4.2 V at a constant current of 0.1 [mA] and then charged at a constant voltage until the current reached 0.05 [mA]. The battery was then discharged to 3.0 [V] at a constant current of 0.2 [mA], and the discharge capacity W0 was measured. After the charge to 4.2 [V] at 0.1 [mA] constant current, the battery was charged at a constant voltage until the current reached 0.05 [mA] and then discharged at 2.0 [mA] constant current to 3.0 [V], and the discharge capacity W1 was measured. The rate performance was evaluated by dividing W1 by W0.

(Cycle Capacity Retention Rate)

The lithium ion battery was charged to 4.2 V at a constant current of 0.1 [mA] and then charged at a constant voltage until the current reached 0.05 [mA]. The battery was then discharged to 3.0 [V] at a constant current of 0.2 [mA] to measure the discharge capacity W0. This measurement was repeated 30 times to determine the 30th discharge capacity W30. The cycle capacity retention rate was evaluated by dividing W30 by W0.

TABLE 4

| | LCO template particle | | | | CoO Matrix | Mixed powder | |
|---|---|---|---|---|---|---|---|
| | Particle diameter | | | | | | |
| | D50 of LCO starting material powder (μm) | Milling | D50 of template particles (μm) | Aspect ratio of template particles | particle D50 of CoO matrix particles (μm) | Template:matrix (weight ratio) | Template particle diameter/ matrix particle diameter |
| Ex. B1 | 3.0 | Pot mill | 0.6 | 5 | 0.3 | 50:50 | 2.0 |
| Ex. B2 | 10.0 | Pot mill | 2.2 | 10 | 0.3 | 50:50 | 7.3 |
| Ex. B3 | 3.0 | Wet jet mill | 1.3 | 15 | 0.3 | 50:50 | 4.3 |
| Ex. B4 | 3.0 | Pot mill | 0.6 | 5 | — | 100:0 | — |
| Ex. B5 | 3.0 | Pot mill | 0.6 | 5 | 0.3 | 10:90 | 2.0 |
| Ex. B6 | 10.0 | Pot mill | 2.5 | 10 | 0.8 | 50:50 | 3.1 |
| Ex. B7 | 3.0 | Pot mill | 0.6 | 5 | 0.3 | 50:50 | 2.0 |
| Ex. B8 | 3.0 | Pot mill | 0.6 | 5 | 0.3 | 50:50 | 2.0 |

| | Compaction | | Primary firing | | Secondary firing | | |
|---|---|---|---|---|---|---|---|
| | Moving rate (m/h) | Layer thickness (μm) | Firing temp. (° C.) | Li/Co | Holding temp. (° C.) | Firing temp. (° C.) | Heating rate (° C./h) |
| Ex. B1 | 100 | 40 | 900 | 1.05 | 800 | 900 | 200 |
| Ex. B2 | 100 | 40 | 900 | 1.05 | 800 | 900 | 200 |
| Ex. B3 | 100 | 40 | 900 | 1.05 | 800 | 900 | 200 |
| Ex. B4 | 100 | 40 | 900 | 1.2 | 800 | 900 | 200 |
| Ex. B5 | 100 | 40 | 900 | 1.05 | 800 | 900 | 200 |
| Ex. B6 | 100 | 40 | 900 | 1.05 | 800 | 900 | 200 |
| Ex. B7 | 100 | 40 | 800 | 1.05 | 800 | 900 | 200 |
| Ex. B8 | 100 | 40 | 900 | 1.05 | 800 | 900 | 400 |

TABLE 5

Result of evaluation of crystallographically oriented positive electrode plate

| | Denseness (%) | Average orientation angle of the primary grains (°) | Area ratio of primary grains having orientation angle within 30° (%) | Rate performance (%) | Cycle capacity retention rate (%) |
|---|---|---|---|---|---|
| Ex. B1 | 98 | 18 | 80 | 70 | 90 |
| Ex. B2 | 95 | 15 | 85 | 84 | 94 |
| Ex. B3 | 97 | 12 | 90 | 80 | 95 |
| Ex. B4 | 90 | 5 | 90 | 55 | 98 |
| Ex. B5 | 99 | 25 | 70 | 65 | 75 |
| Ex. B6 | 97 | 13 | 95 | 88 | 95 |
| Ex. B7 | 99 | 20 | 80 | 75 | 80 |
| Ex. B8 | 98 | 15 | 90 | 80 | 94 |

As shown in Table 5, in Examples B1 to B8, a green body for the positive electrode was formed using a method in which a shear force was applied to the plate-shaped LCO template particles to set the inclination angle of the (003) plane of the primary grains to 25° or less, resulting in enhancements in the rate performance and the cycle capacity retention rate.

Example C

As described above, it is known that the preferable electrostatic capacity as a bypass capacitor to be disposed just proximal to the IC (for example, less than 1 cm) is 0.001 μF to 0.1 μF. Based on this knowledge, the numerical ranges of various characteristics of the solid electrolyte of a chip-type all-solid-state lithium secondary battery (solid electrolyte: LiPON, size: 1 cm×1 cm, battery capacity: 10 mWh) were investigated.

In the chip-type secondary battery, the electrostatic capacity $C_-$ occurring at the interface between the solid electrolyte layer and the negative electrode layer, the electrostatic capacity $C_{se}$ occurring at the solid electrolyte layer, and the electrostatic capacity $C_+$ occurring at the interface between the solid electrolyte layer and the positive electrode layer are as follows:

$C_- = 4.3 \times 10^{-7}$ F/cm$^2$, $C_{se} = 2.4 \times 10^{-8}$ F/cm$^2$, and $C_+ = 1.1 \times 10^{-4}$ F/cm$^2$.

These values are inserted into the equation of $1/C = (1/C_-) + (1/C_{se}) + (1/C_+)$ to give $C = 2 \times 10^{-8}$ F/cm. The results demonstrate that this value is substantially determined by $C_{se}$. Meanwhile, at a measuring frequency of 1 MHz, the relative dielectric constant $\varepsilon_r$ of LiPON is about 80 and the relative dielectric constant $\varepsilon_r$ of Li$_3$ClO is about 45.

In the case where the IC size is fixed to 5 mm by 5 mm and the thickness of the solid electrolyte layer is fixed to 3 μm, the following relation is established for the lower limit 0.001 μF of the electrostatic capacity preferable for a bypass capacitor:

0.001 μF=1×10$^{-9}$ F=$\varepsilon_0 \varepsilon_r$ (S/d)

where S is the IC size area (25×10$^{-8}$ m$^2$), d is the thickness of the solid electrolyte layer (3×10$^{-6}$ m), $\varepsilon_0$=8.85×10$^{-12}$ F/m.

These values are inserted into the equation to give a relative dielectric constant $\varepsilon_r$ of 14 of the solid electrolyte. Similarly, regarding the upper limit 0.1 μF of the electrostatic capacity preferable for a bypass capacitor, the calculated relative dielectric constant $\varepsilon_r$ of the solid electrolyte is 1400. Accordingly, the preferable range as the relative dielectric constant $\varepsilon_r$ of the solid electrolyte is 10 to 2000.

Meanwhile, the thickness of the solid electrolyte layer is inversely proportional to C, the preferred thickness is:

D=(8.85×10$^{-12}$)×80×[(25×10$^{-6}$)/(1×10$^{-9}$)]=1.8×10$^{-5}$ (m)=18 (μm), which is approximately 20 μm. The constant 80 is the relative dielectric constant $\varepsilon_r$ of LiPON. Accordingly, the preferable range of the thickness of the solid electrolyte layer is 0.1 to 20 μm.

Example D1: Application to Power Source for High Load IC Chip

Figure 16:
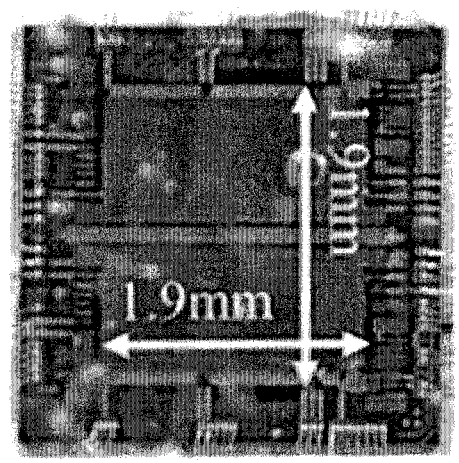
FIG. 16 is a photograph of a semiconductor chip for artificial intelligence (AI) referred to in Example D1.

An example application involving rapid charge and discharge of chip-type all solid-state lithium secondary batteries (hereinafter referred to as chip batteries) is a power source for high load IC chips. Since automated operations of automobiles, drone control, autonomous robot control, and artificial intelligence (AI) ICs or image processing ICs driven by batteries due to the difficulty in using commercial power sources for facial authentication from outdoor surveillance camera images, which are expected to spread in the future, are each required to process a large volume of data with one chip; hence, the heat generation of the IC chip is expected to increase, along with the high load operation. For example, the semiconductor chip for artificial intelligence (AI) with 1.9 mm by 1.9 mm square shown in FIG. 16 (available from Toshiba Corporation) consumes 1 watt power (corresponding to 300 mA at 3.3 V). The waste heat from the high load IC can be used for heating of and rapid charge and discharge of the chip battery, resulting in a supply of a stable and highly accurate power source voltage, and thereby improved reliability of the IC operation. The battery with a built-in heater by wiring resistance is used to heat the battery while the temperature of the battery is monitored with the battery monitoring IC, and thereby the temperature of the battery can be controlled.

Like all-solid-state lithium secondary batteries, lithium ion secondary batteries including an ionic liquid as an electrolytic solution can also be used in the above applications.

Figure 17:
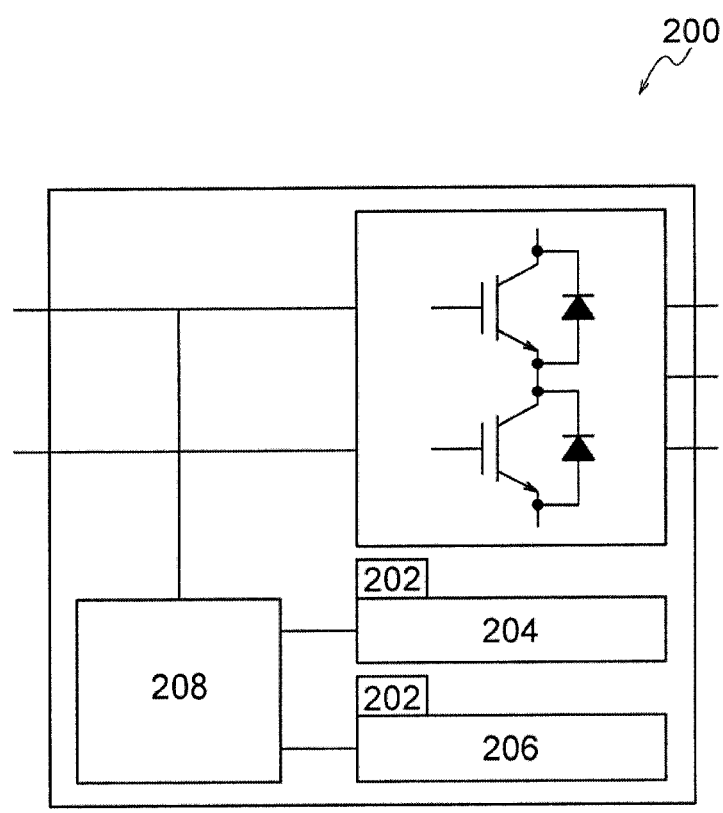
FIG. 17 is a schematic diagram of a battery built-in inverter referred to in Example D2.

Example D2: Application to Power Source for Pre-Driver/Microcomputer for High Voltage Inverter Another example of the rapid charge and discharge application of a chip-type all-solid-state lithium secondary battery (hereinafter referred to as a chip battery) is a power source for a pre-driver/microcomputer for a high-voltage inverter. In particular, high-voltage inverters for hybrid vehicles (HVs) and electric vehicles (EVs) generate noise on the ground during the switching operation of the bridge circuit to adversely affect the operation reliability of driver ICs and CPUs having small power source potentials. Meanwhile, the high voltage inverter generates a large amount of heat. Accordingly, it is conceivable to mount the chip battery 202 on the pre-driver 204 and the CPU 206 in the inverter 200, as shown in FIG. 17. The pre-driver 204 and the CPU 206 are connected to the reference voltage source 208 in FIG. 17. According to such a battery built-in inverter, the waste heat of the inverter can be used for heating of and rapid charge and discharge of the chip battery, and thereby the power supply voltages of the driver IC and the CPU can be stabilized. The battery with a built-in heater by wiring resistance is used to heat the battery while the temperature of the battery is monitored with the battery monitoring IC, and thereby the temperature of the battery can be controlled.

Like all-solid-state lithium secondary batteries, lithium ion secondary batteries using an ionic liquid as an electrolytic solution can also be used in the above applications.

What is claimed is:

1. An integrated circuit (IC) substrate with a mounted secondary battery comprising:
   a printed wiring board;
   a plurality of IC chips mounted on the printed wiring board;
   a plurality of all-solid-state lithium secondary batteries mounted in an area directly on or above or directly below the IC chip or within 1 cm from the outer edge of the IC chip, wherein each of the all-solid-state lithium secondary batteries comprises a positive electrode layer, a solid electrolyte layer and a negative electrode layer, wherein the solid electrolyte layer has a thickness of 0.1 to 20 µm and longitudinal and transverse dimensions in a range of 1 to 50 mm,
   wherein at least one all-solid-state lithium secondary battery for each of the IC chips is connected as a most downstream power source configured to a power source voltage level required for the IC chip, whereby electric power is individually distributed and supplied to the plurality of IC chips from the plurality of all-solid-state lithium secondary batteries; and
   wherein the IC substrate with a mounted secondary battery further comprising a battery controller that supplies a peak current from the all-solid-state lithium secondary battery to the IC chips to respond to instantaneous high load operation of the IC chips and charges the all-solid-state lithium secondary battery after completion of the high-load operation.

2. The IC substrate with a mounted secondary battery according to claim 1, wherein the at least one all-solid-state lithium secondary battery corresponding to each of the IC chips has a specification individually customized according to the performance or specification of the each corresponding IC chip.

3. The IC substrate with a mounted secondary battery according to claim 1, wherein the all-solid-state lithium secondary battery itself has a function as a bypass capacitor, thereby being capable of supplying a temporarily increased peak current in addition to a steady current.

4. The IC substrate with a mounted secondary battery according to claim 3, wherein the solid electrolyte layer, an interface between the solid electrolyte layer and the negative electrode layer, and another interface between the solid electrolyte layer and the positive electrode layer has an electrostatic capacity sufficient to allow the all-solid-state lithium secondary battery to function as a bypass capacitor as a whole, and the electrostatic capacity is derived from a parasitic capacitance in an equivalent circuit including the power source.

5. The IC substrate with a mounted secondary battery according to claim 1, wherein a material constituting the solid electrolyte layer has a relative dielectric constant $\varepsilon_r$ of 10 to 2000.

6. The IC substrate with a mounted secondary battery according to claim 1, wherein the all-solid-state lithium secondary battery has a thickness of 10 to 5000 µm and longitudinal and transverse dimensions in a range of 1 to 50 mm.

7. The IC substrate with a mounted secondary battery according to claim 1, wherein the all-solid-state lithium secondary battery has an energy density of 10 to 700 Wh/L.

8. The IC substrate with a mounted secondary battery according to claim 1, wherein the positive electrode layer comprises a lithium composite oxide having a layered rock salt structure, the solid electrolyte layer comprises a lithium ion conductive material, and the negative electrode layer comprises lithium.

9. The IC substrate with a mounted secondary battery according to claim 1, wherein each of the IC chips is accommodated together with the corresponding power source in a case into a form of an IC package provided with a built-in secondary battery.

10. The IC substrate with a mounted secondary battery according to claim 9, wherein the IC package provided with a built-in secondary battery comprises no bypass capacitor in an area within 1 cm from the outer edge of the IC chip.

11. The IC substrate with a mounted secondary battery according to claim 9, wherein the IC package provided with a built-in secondary battery comprises no bypass capacitor.

12. The IC substrate with a mounted secondary battery according to claim 1, wherein the all-solid-state lithium secondary battery is disposed, as an inner layer of the printed wiring board, directly below the IC chip.

13. The IC substrate with a mounted secondary battery according to claim 12, wherein the IC substrate provided with a built-in secondary battery comprises no bypass capacitor in an area within 1 cm from the outer edge of the IC chip.

14. The IC substrate with a mounted secondary battery according to claim 12, wherein the IC substrate provided with a built-in secondary battery comprises no bypass capacitor.

* * * * *